United States Patent
Wisnia et al.

(10) Patent No.: US 10,606,367 B2
(45) Date of Patent: Mar. 31, 2020

(54) COMMAND RELAY DEVICE, SYSTEM AND METHOD FOR PROVIDING REMOTE ASSISTANCE/REMOTE CONTROL

(71) Applicant: Light Wave Technology Inc., St-Laurent (CA)

(72) Inventors: Jack Wisnia, Dollard-des Ormeaux (CA); Feng Du, Kirkland (CA)

(73) Assignee: LIGHT WAVE TECHNOLOGY INC., St-Laurent, QC (CA)

( * ) Notice: Subject to any disclaimer, the term of this patent is extended or adjusted under 35 U.S.C. 154(b) by 0 days.

(21) Appl. No.: 15/753,839

(22) PCT Filed: Jul. 11, 2017

(86) PCT No.: PCT/CA2017/050839
§ 371 (c)(1),
(2) Date: Feb. 20, 2018

(87) PCT Pub. No.: WO2018/010023
PCT Pub. Date: Jan. 18, 2018

(65) Prior Publication Data
US 2019/0011997 A1    Jan. 10, 2019

Related U.S. Application Data

(63) Continuation-in-part of application No. PCT/CA2017/050740, filed on Jun. 16, 2017, and a
(Continued)

(51) Int. Cl.
*G06F 3/02* (2006.01)
*G06F 3/14* (2006.01)
(Continued)

(52) U.S. Cl.
CPC ............... *G06F 3/02* (2013.01); *G06F 3/023* (2013.01); *G06F 3/0227* (2013.01);
(Continued)

(58) Field of Classification Search
CPC ......... G06F 3/02; G06F 3/1454; H04L 12/16; G09G 2340/02; G09G 2370/16
See application file for complete search history.

(56) References Cited

U.S. PATENT DOCUMENTS 5,903,259 A  *  5/1999  Brusky ................... G06F 3/023
                                                      345/168
7,629,963 B1    12/2009 Wright
(Continued)

FOREIGN PATENT DOCUMENTS

WO    WO 2013/121435 A1    8/2013
WO    WO 2013/179637 A1    12/2013

OTHER PUBLICATIONS

Core Bluetooth Background Processing for iOS Apps, copyright 2012 apple inc. online, retrieved Sep. 15, 2017 from developer.apple.com.
(Continued)

*Primary Examiner* — Towfiq Elahi
(74) *Attorney, Agent, or Firm* — Anglehart et al.

(57) ABSTRACT

A command relay device provides remote assistance or remote use of a computer. It has a data interface for receiving commands directly or indirectly from a remote user, a keyboard interface for transmitting at least one keyboard command to the computer and a command link between the keyboard interface and the data interface.

5 Claims, 14 Drawing Sheets

Related U.S. Application Data continuation-in-part of application No. PCT/CA2016/050809, filed on Jul. 11, 2016, and a continuation-in-part of application No. PCT/CA2017/050285, filed on Mar. 2, 2017.

(60) Provisional application No. 62/474,012, filed on Mar. 20, 2017.

(51) Int. Cl.
  *H04L 12/16* (2006.01)
  *G06F 9/451* (2018.01)
  *G06F 3/023* (2006.01)

(52) U.S. Cl.
  CPC .............. *G06F 3/0231* (2013.01); *G06F 3/14* (2013.01); *G06F 3/1454* (2013.01); *G06F 9/452* (2018.02); *G06F 9/453* (2018.02); *H04L 12/16* (2013.01); *G06F 2203/0383* (2013.01); *G09G 2340/02* (2013.01); *G09G 2370/16* (2013.01)

(56) References Cited

U.S. PATENT DOCUMENTS

| | | | |
|---|---|---|---|
| 7,975,017 | B1 | 7/2011 | Kuzkin et al. |
| 8,010,630 | B2 | 8/2011 | Barreto et al. |
| 8,194,132 | B2 | 6/2012 | Dayan et al. |
| 8,204,498 | B1 | 6/2012 | Smith et al. |
| 8,407,291 | B1 | 3/2013 | Irwin et al. |
| 8,855,719 | B2 | 10/2014 | Jacobsen et al. |
| 9,311,167 | B2 | 4/2016 | Kim et al. |
| 2003/0133014 | A1 | 7/2003 | Mendoza |
| 2004/0077349 | A1 | 4/2004 | Barak et al. |
| 2005/0283661 | A1 | 12/2005 | Wong et al. |
| 2006/0098094 | A1 | 5/2006 | Lott |
| 2007/0152811 | A1 | 7/2007 | Anderson |
| 2007/0219686 | A1 | 9/2007 | Plante |
| 2008/0250485 | A1 | 10/2008 | Schreyer et al. |
| 2009/0187687 | A1 | 7/2009 | Hulbert et al. |
| 2009/0244282 | A1 | 10/2009 | Eguiguren |
| 2009/0307679 | A1 | 12/2009 | Lee et al. |
| 2010/0214212 | A1 | 8/2010 | Chen et al. |
| 2010/0261507 | A1 | 10/2010 | Chang et al. |
| 2011/0004888 | A1 | 1/2011 | Srinivasan et al. |
| 2011/0145926 | A1 | 6/2011 | Dalcher et al. |
| 2011/0246753 | A1 | 10/2011 | Thomas |
| 2011/0252384 | A1 | 10/2011 | Calman et al. |
| 2012/0109406 | A1 | 5/2012 | Yousefi et al. |
| 2012/0197484 | A1 | 8/2012 | Nath et al. |
| 2012/0256541 | A1 | 10/2012 | Dandrow |
| 2013/0007224 | A1* | 1/2013 | Yang ....................... H04L 67/08 709/219 |
| 2013/0130777 | A1 | 5/2013 | Lemay et al. |
| 2013/0144629 | A1 | 6/2013 | Johnston et al. |
| 2013/0278484 | A1 | 10/2013 | Hwang et al. |
| 2013/0307796 | A1 | 11/2013 | Liu et al. |
| 2013/0321629 | A1 | 12/2013 | Zhang et al. |
| 2014/0154648 | A1 | 6/2014 | Gonsalves et al. |
| 2014/0173115 | A1 | 6/2014 | Aasheim et al. |
| 2014/0208170 | A1 | 7/2014 | Simons et al. |
| 2014/0282046 | A1 | 9/2014 | Gonsalves et al. |
| 2014/0365214 | A1 | 12/2014 | Bayley |
| 2015/0015479 | A1 | 1/2015 | Cho |
| 2015/0035646 | A1 | 2/2015 | Han |
| 2015/0126174 | A1 | 5/2015 | Gray |
| 2015/0294398 | A1 | 10/2015 | Khalid et al. |
| 2015/0312572 | A1 | 10/2015 | Owen |
| 2015/0319178 | A1 | 11/2015 | Desai et al. |
| 2015/0359466 | A1 | 12/2015 | Tilvis et al. |
| 2016/0036894 | A1 | 2/2016 | Collins et al. |
| 2016/0062721 | A1 | 3/2016 | Marcos et al. |
| 2016/0085602 | A1 | 3/2016 | Jacobson et al. |
| 2016/0098362 | A1 | 4/2016 | Summers |
| 2017/0099560 | A1* | 4/2017 | Perlmutter .............. H04L 67/20 |

OTHER PUBLICATIONS

PCT/CA2016/050809 written opinion.
PCT/CA2016/050809 international search report with related claims.
PCT/CA2017/050285 IPRP.
PCT/CA2017/050285 Search report with related claims.
PCT/CA2017/050285 written opinion.
PCT/CA2017/050740 international search report with related claims.
PCT/CA2017/050740 written opinion.
PCT/CA2017/050837 international search report with related claims.
PCT/CA2017/050837 written opinion.
PCT/CA2017/050839 international search report with related claims.
PCT/CA2017/050839 written opinion.

* cited by examiner

COMMAND RELAY DEVICE, SYSTEM AND METHOD FOR PROVIDING REMOTE ASSISTANCE/REMOTE CONTROL

The present application is a continuation-in-part of international application No. PCT/CA2016/050809 filed on Jul. 11, 2016, that is a continuation-in-part of international application No PCT/CA2016/050710 filed on Jun. 17, 2016, is a continuation-in-part of international application No PCT/CA2017/050740 filed on Jun. 16, 2017, that is a continuation-in-part of international application No PCT/CA2017/050285 filed on Mar. 2, 2017, that claims priority of U.S. provisional application No. 62/323,031 filed Apr. 15, 2016; and claims priority of U.S. provisional application No. 62/474,012 filed on Mar. 20, 2017.

TECHNICAL FIELD

The present invention relates to devices and systems for providing remote assistance to a computer, and more specifically to a computer running an operating system that restricts the ability of one application to control another.

BACKGROUND

Remote assistance of a computer involves a software application or a feature of the computer's operating system where the computer's desktop environment is at least allowed to be viewed remotely on a separate client device where a remote user can provide technical support. Remote assistance may also involve, at least to a limited degree, remotely controlling the client's desktop by attaching to the client's session.

Remote desktop control or remote access to a computer involves a software application or a feature of the computer's operating system where the computer's desktop environment can be fully controlled remotely without any local user present at the computer.

Remote assistance and/or control of a computer with an operating system where each of its application programs is respectively run in its own sandbox (i.e. wherein each application program is restricted from accessing any storage or memory used by any other program) proves to be challenging as a result of these application programs running in such a restricted operating system environment. In this kind of operating system, each application program is restricted in its access to, for example, data, files and network resources. As each application program exists in its own sandbox, the sandbox directory acts as a home for the application program and its data. Consequently, the ability of a software application to function as a remote assistance or remote access tool is not possible because of the limited ability of the software application to see the data or state of another application.

An operating system where the application programs are run in a sandboxed manner is, for example, Apple™'s iOS, run on such devices as the Apple iPad or iPhone®. This means that users of iPad and iPhone computing devices cannot effectively be helped by remote assistance like users of computers that have more flexible operating systems, like Apple Computer OSX and Microsoft Windows® computers. iPad users must seek help by physically finding a person able to help who can interact with the iPad in the presence of the users. The benefits of remote assistance are significant in that assistance can be provided by family members who do not live with the person needing assistance, or can be provided by professionals without the users needing to visit the professionals. There are over 300 million iPad computers sold in the period of 2010 to 2016. Furthermore, remote access to such devices is likewise not currently possible.

SUMMARY

Applicant has discovered that the keyboard interface, for example the Bluetooth wireless keyboard interface available on iOS devices, can be used to interact with a foreground process on a computer while the source of the keyboard commands can be automated or issued from a remote source in such a way that the barrier imposed by operating systems like the iOS that impede the ability of one application program from accessing or controlling the data used by another application program can effectively be defeated or by-passed.

A first broad aspect is a command relay device for providing remote assistance or remote use of a computing device, wherein the computing device comprises an operating system limiting communication between application programs and limiting sharing of data between application programs. The command relay device has a data interface configured to receive command input from a remote computer, a keyboard interface configured to transmit at least one control command corresponding to the command input to an external keyboard interface of the computing device, and a command link between the keyboard interface and the input interface.

In some embodiments, the command relay device may have a screen sharing component configured to enable sharing of an image or a stream of images of a display of the computing device with the remote computer. The screen sharing component may be configured to periodically send a message signal to cause an activation of a background application program of the computing device to run on the computing device to retrieve an image stored in a copy buffer of the computing device and transmit directly or indirectly the image to the remote computer; may be configured to receive image data from a screen sharing function of the computing device and transmit the image data directly or indirectly to the remote computer; and/or may be configured to periodically send a sequence of keyboard commands to the computing device to cause the computing device to take a screen capture of the display and store the screen capture in a copy buffer of the computing device.

In some embodiments, the screen sharing component may be configured to periodically send a message signal to cause an activation of a background application program of the computing device to run on the computing device to retrieve an image stored in a copy buffer of the computing device and transmit directly or indirectly the image to the remote computer. In some embodiments, the screen sharing component may be configured to receive image data from a screen sharing function of the computing device and transmit the image data directly or indirectly to the remote computer. In some embodiments, the screen sharing component may be further configured to compress the image data. The screen sharing component may have a codec. The screen sharing component may have a graphics processing unit.

In some embodiments, the screen sharing component may be configured to periodically send a sequence of keyboard commands to the computing device to cause the computing device to take a screen capture of the display and store the screen capture in a copy buffer of the computing device. The command link may be further configured to convert the command input into control commands prior to transmission of the control commands. The control commands may have HID commands. The control commands may have keyboard commands.

The keyboard interface may be configured to establish a wired connection with the external keyboard interface of the computer. The external keyboard interface may be configured to accept external power for powering the computing device, wherein the command relay device may be further configured to provide power to the computing device via the external keyboard interface. The external keyboard interface may be configured to transmit and receive image data, and wherein the command relay device may be further configured to receive image data from the computing device via the external keyboard interface.

The keyboard interface may be configured to establish a wireless connection with the external keyboard interface of the computer. The keyboard interface may be a Bluetooth interface. The data interface may share a common Bluetooth transceiver with the keyboard interface. The data interface may be a WiFi interface.

A second broad aspect is a system for remote assistance or remote use of a computer. The system has a computer having an external keyboard interface and an operating system allowing for keyboard commands to control an operation of the computer. The system has a command relay device as defined herein. The operating system provides a copy buffer sharable between application programs run by the operating system, and the system comprises a remote control assistance application program stored in memory of the computer and permitted to run in a background mode, wherein the command relay device is operative to send keyboard commands to the computer to place a screen image of a foreground process of the computer into the copy buffer where the background mode remote control assistance application program can access the screen image; and at least one of the command relay device and the remote control assistance application program is configured to send information about a foreground mode of the computer obtained by the remote control assistance application program from the screen image to a remote user; and/or the computer comprises a display image output interface for sending image data of a display image of the computer, and the command relay device further comprises a video receiver for receiving the image data and configured to send information about the display image to a remote user via the data interface.

In some embodiments, the command relay device and/or the remote control assistance application program may be further configured to receive command data from the remote user to cause the command relay device to issue keyboard commands to the computer on behalf of the remote user for performing remote control. The keyboard commands may include commands for pointer control and/or touch screen press location control. The information about a foreground mode of the computer may be the screen image.

In some embodiments, the system may have a remote desktop server connecting the remote user to the computer and the command relay device. The remote control assistance application program may communicate with the remote user and may relay commands from the remote user to the command relay device. The remote control assistance application program may communicate with the remote user using a WiFi connection to the Internet, and may relay commands from the remote user to the command relay device using a Bluetooth connection. The operating system of the computer may be an Apple Computer iOS operating system.

In some embodiments, the command relay device may periodically send messages to the computer to cause an activation of the remote control assistance application program to run on the computer and to detect if there is image data of a display image of the computer to be sent, in response to which the remote control assistance application program can be expected to cause the sending of the image data to one of the remote user and the command relay device.

A third broad aspect is a method of providing remote assistance to a local user or remote control of a computer running a foreground app and able to run a background app. The method involves providing a command relay device having a data interface for receiving commands directly or indirectly from a remote computer, a keyboard interface for transmitting at least one control command to an external keyboard interface of the computer, and a command link between the keyboard interface and the data interface. The method involves sharing an image of display of the computer by performing the sending a command using the keyboard interface of the command relay device to trigger capturing an image of the display and causing a background application program to transmit the image to the remote computer; and/or the connecting the command relay device to a video mirroring function of the computer, compressing screen video received at the command relay device and transmitting the image of the display of the computer to the remote computer. The method includes using input from the remote user data to transmit the commands to the data interface to provide remote assistance to the local user or remote control of the computer. The method by-passes any need for a background app to have within an operating system of the computer direct control access of the foreground app.

In some embodiments, the sharing an image of display of the computer may include sending a command using the keyboard interface of the command relay device to trigger capturing an image of the display and causing a background application program to transmit the image to the remote computer. In some embodiments, the sharing an image of display of the computer may include connecting the command relay device to a video mirroring function of the computer, compressing screen video received at the command relay device and transmitting the image of the display of the computer to the remote computer.

In some embodiments, the control commands may include HID commands. The control commands may include keyboard commands.

BRIEF DESCRIPTION OF THE DRAWINGS

The invention will be better understood by way of the following detailed description of embodiments of the invention with reference to the appended drawings, in which.

DETAILED DESCRIPTION

In the present application, by "control commands" it is meant commands that are carried out by the operating system of a computer to cause the computer to perform certain functions. Control commands may be, for example, HID commands, keyboard commands, etc.

Figure 1:
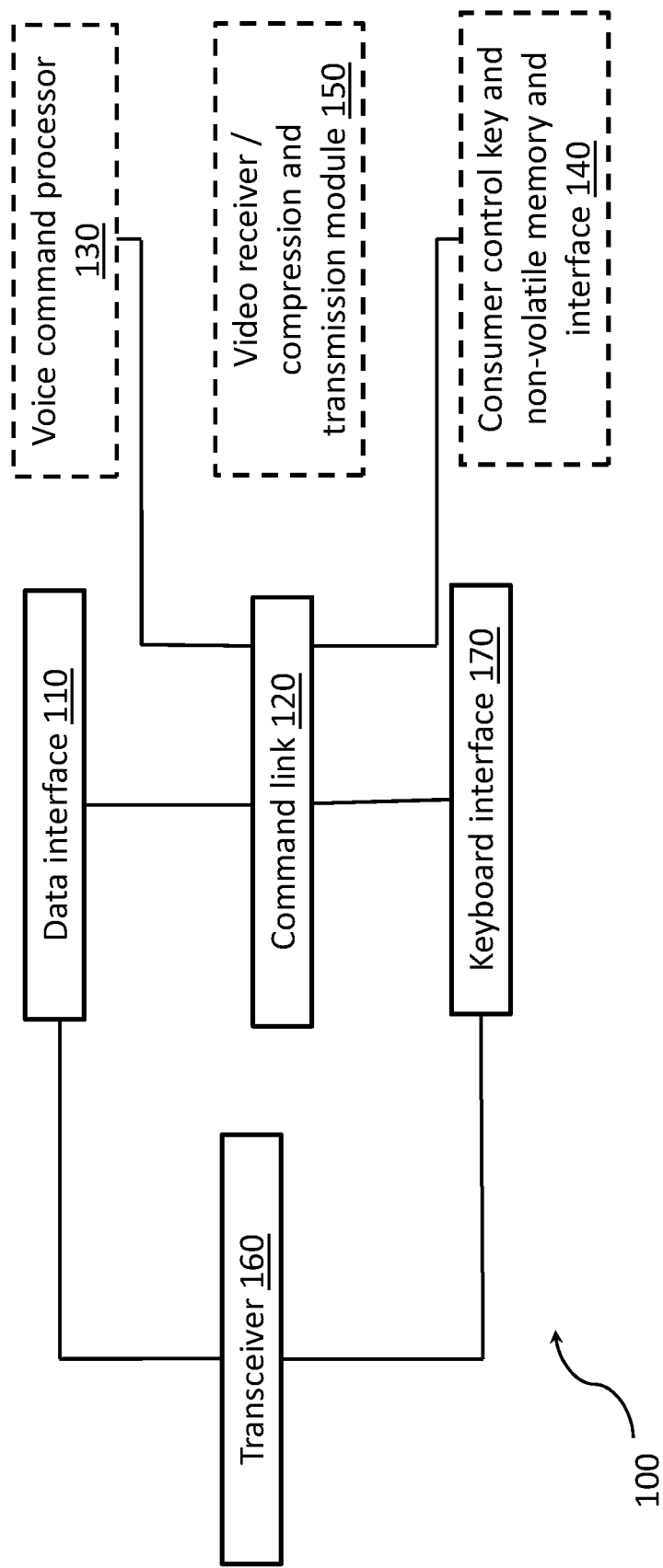
FIG. 1 is a block diagram illustrating an exemplary command relay device.

With reference to the drawings, FIG. 1 depicts an exemplary command relay device 100 for providing remote assistance or remote use of a computer. The computer can have, for example, an operating system allowing for multiple application programs to run at the same time in a sandboxed manner such that they are limited in their communication and sharing of data between application programs. An exemplary operating system is the Apple iOS. The computer may also have a copy buffer which is sharable between the application programs. The application programs may be, for example, native applications or downloadable application programs.

The command relay device 100 comprises a data interface 110 for receiving commands directly or indirectly from a remote user. The remote user may be operating any electronic device, for example, a desktop computer, a mobile device, a tablet computer or a laptop, such as an Apple iPhone®, iPod Touch®, iMac®, Android tablet or Android smartphone and the like. The data interface 110 may also send foreground information of the computer to a remote user. Such foreground information may include, for instance, a screen image of the computer's foreground mode.

Figure 2:
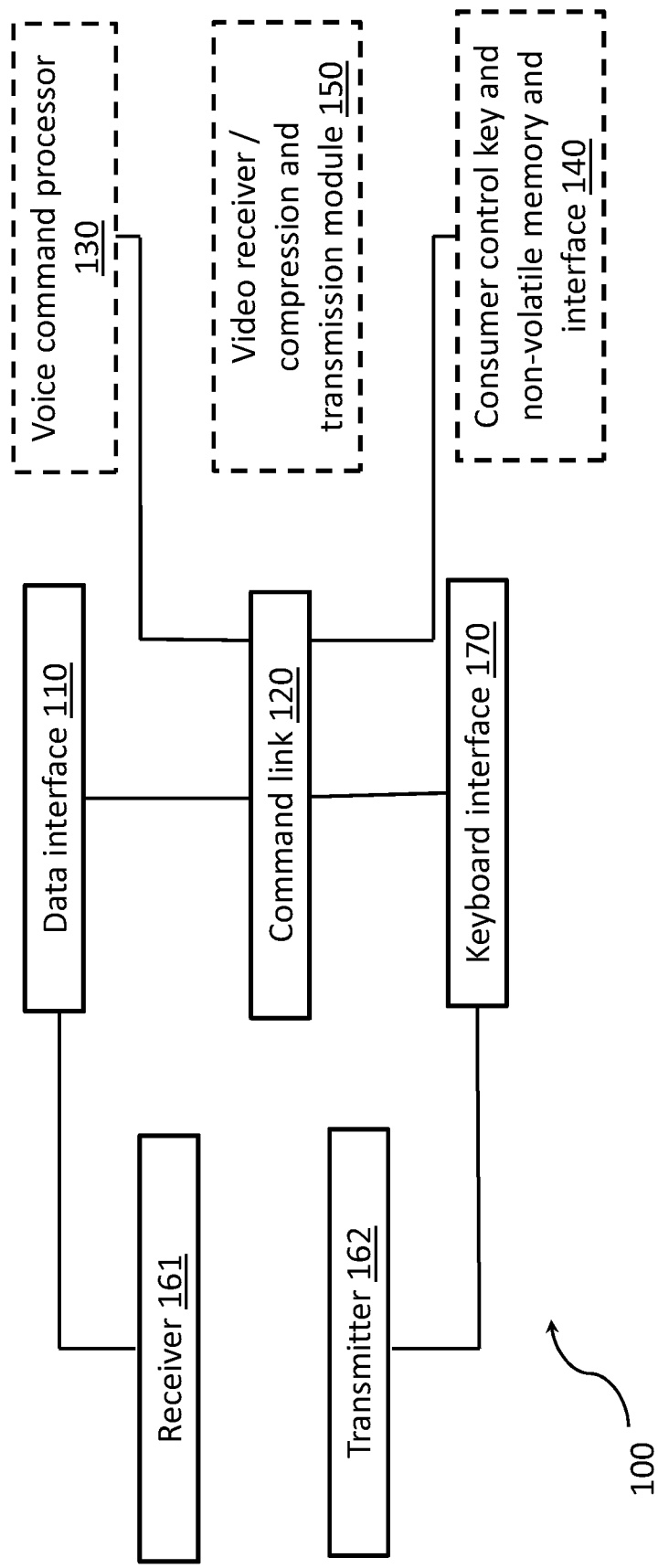
FIG. 2 is a bock diagram illustrating an exemplary command relay device.

The data interface 110 (e.g. may be a WiFi card, an Ethernet card) may communicate with the computer using, for example, a wireless connection (e.g. a Bluetooth connection), via a Bluetooth transceiver 160. However, in other embodiments, the connection between the data interface 110 and the computer may be wired, (e.g. wired cable connection, fiber optic connection) or may be a WiFi connection, using, for example, a WiFi receiver 161 as shown in FIG. 2.

The keyboard commands originating from the remote user may be those associated with a touch screen such as simple or multi-touch gestures with a special stylus by using one or more fingers like, in the case of the Apple iPhone®, the swipe action to unlock the phone. These gestures may also include the use of an on-screen keyboard or on-screen mouse. Keyboard commands may also include pressing peripheral buttons on the touch screen device like the volume button or the home button. Keyboard commands may also be those associated with using a desktop computer having a physical keyboard and mouse, such as the entering of keys on the keyboard, the clicking of the mouse, the movements of the mouse cursor on the screen or the pressing of buttons on a joystick or game controller. The person having ordinary skill in the art will recognize that other keyboard commands may be used without departing from the teachings of the present invention.

The exemplary command relay device 100 further comprises a keyboard interface 170 for transmitting at least one control command to the remotely assisted and/or used computer (e.g. a keyboard interface of a peripheral device, such as a keyboard or mouse—for sending keyboard commands to the computer and then processed by the computer's OS). For example, a control command may be processed by the computer's operating system and then allowed to launch application programs or apps of the computer. In the example of the Apple iPhone®, keyboard commands can be used to perform actions that normally are associated with the device's touch screen actions or buttons, as for example, the swipe action to initiate unlocking a locked phone, the pressing of the home button, volume control, etc. Likewise, running a desired app can be implemented by using a keyboard command to initiate a search or find on the smartphone, and then sending keystrokes of the name of the app on the smartphone will cause the desired app to be found, with another keystroke, such as ENTER.

In the example where the remotely assisted and/or used computer is a smartphone like an Apple iPhone®, the keyboard commands are received by parts of the smartphone that process such commands and allow these commands to launch application programs, such as the handheld computer OS's consumer control key module and the handheld computer OS application program launch.

In the case where the remotely assisted and/or used computer is an Apple iPhone®, an example of a command that simulates a press on touch screen can be as follows:

```
Enable assistive touch
/* HID map descriptor */
const unsigned char startHidMouseMessage[ ] =
{
    /* param 1 HIDComponentIdentifier*/
    0x00,0x06,  /* length */
    0x00,0x00,  /* ID */
    0x00,0x00,
    /* param 2 vendorIdentifer */
    0x00,0x06,  /* length */
    0x00,0x01,  /* ID */
    0x04,0x61,
    /* param 3 productIdentifier */
    0x00,0x06,  /* length */
    0x00,0x02,  /* ID */
    0x00,0x00,
    /* param 4 HID report descriptor */
    0x00,0x36,  /* length */
```

```
    0x00,0x04, /* ID */
    0x05 ,0x01,
    0x09 ,0x02,
    0xa1 ,0x01,
    0x09 ,0x01,
    0xa1 ,0x00,
    0x05 ,0x09,
    0x19 ,0x01,
    0x29 ,0x03,
    0x15 ,0x00,
    0x25 ,0x01,
    0x95 ,0x03,
    0x75 ,0x01,
    0x81 ,0x02,
    0x95 ,0x01,
    0x75 ,0x05,
    0x81 ,0x01,
    0x05 ,0x01,
    0x09 ,0x30,
    0x09 ,0x31,
    0x15 ,0x81,
    0x25 ,0x7f,
    0x75 ,0x08,
    0x95 ,0x02,
    0x81 ,0x06,
    0xc0 ,
    0xc0
    };
    ISPP_Send_Control_Message(BluetoothStackID,
SerialPortID,0x5400,0,NULL);    //start assistivetouch
    ISPP_Send_Control_Message(BluetoothStackID,
SerialPortID,0x6800,sizeof(startHidMouseMessage),(unsigned
char *)startHidMouseMessage);
To simulate the screen press:
unsigned char mouseCmd[ ] =
{
    /* param 1 HIDComponentIdentifier*/
    0x00,0x06,  /* length */
    0x00,0x00, /* ID */
    0x00,0x00,
    /* param 2 vendorIdentifer */
    0x00,0x07,  /* length */
    0x00,0x01, /* ID */
    0x01,0x00,0x00
};
    ISPP_Send_Control_Message(BluetoothStackID,
    SerialPortID,0x6802,sizeof(mouseCmd),mouseCmd);
```

It will be understood that the keyboard commands used to cause the computer to perform certain tasks, and as well the HID commands, depend on the platform of the smartphone. The sequence of keyboard commands also depends upon the task to be carried out. Therefore, a skilled person will readily understand that a desired sequence of keyboard commands, or a desired HID command, for a specific platform may be determined using basic trial and observation, where the effect of receiving a specific sequence of keyboard commands (and HID commands) by the smartphone is monitored for the desired action.

In an embodiment of the exemplary command relay device 100, the keyboard interface 170 uses a Bluetooth interface, functioning with, for example, a Bluetooth transceiver 160, establishing a Bluetooth connection with the remotely assisted and/or used computer's wireless interface (not shown in FIG. 1). The keyboard commands are transmitted using the bandwidth limited Bluetooth connection from the command relay device's 100 keyboard interface 170 to the Bluetooth interface of the remotely assisted and/or used computer. In alternative embodiments, the keyboard interface 170 may be another form of wireless interface, establishing for example a WiFi link (although Bluetooth is faster to start the operations than when using WiFi), a Wireless USB or 60 GHz link. Therefore, while in this description reference is made to Bluetooth wireless transmission, it is to be understood that this is a commonly used wireless transmission protocol. It will be appreciated that any suitable wireless transmission protocol can be applied to variant embodiments herein. In some embodiments, the connection between the keyboard interface 170 and the interface of the computer may be wired, where the connection is establishing using, for instance, a connector with, e.g., a lightning port.

The exemplary command relay device 100 further comprises a command link 120 between the data interface 110 and the keyboard interface 170. The command link 120 serves as a conduit, transferring command input received from the data interface 110 as control commands to the transmitting keyboard interface 170. The command link 120 may also function as a translator, translating the command input received from the remote user, the remote user using a first specific computer, to control commands that would be recognized by the second computer receiving the commands and being remotely assisted or used, where this second computer may use a different input language than the first. For example, the remote user may be using a desktop computer operating on a Microsoft™ OS, such as a version of Windows™, and the keyboard commands are either keystrokes on a physical keyboard or the clicking of a mouse. The computer to be remotely assisted or used in this example may be an Apple iPhone®, this smartphone responsive, for example, to gestures on a touchscreen or the pressing of peripheral buttons located on the mobile device, such as the volume button. Hence, in the present example, the command link 120 would translate the command data originating from the remote user's desktop computer (e.g. the mouse clicks and keyboard input), received by the data interface 110 and channeled to the command link 120, this command data translated to specific control commands which may be processed by, e.g., an Apple iPhone®, yielding a specific result on the aforesaid smartphone. Alternatively, the command link 120 may optionally communicate with a consumer control key and non-volatile memory and interface 140 of the command relay device 100, where the layout or configuration of a peripheral device (e.g. a mouse, a keyboard) of the remote user's computer may be stored in memory. The memory of the consumer control key and non-volatile memory and interface 140 may be for example, random access memory. The module 140 may also receive such configurations from, for example, a remote user, acting as an interface with the remote user. The interface portion of the consumer control key and non-volatile memory and interface 140 may be an interface for establishing a low-bandwidth wireless connection, such as a Bluetooth interface, or a wireless interface, such as a WiFi interface. The command link 120 may access this layout or configuration information to process the command data into keyboard commands that may be processed by the remotely assisted and/or control computer. These translated or processed keyboard commands are then sent to the keyboard interface 170 via the command link 120, the keyboard interface 170 then transmitting said translated/processed keyboard commands to, for example, the local user's Apple iPhone®. The Apple iPhone® receives and processes the commands, resulting in the desired action carried out on the device. In other embodiments, the remotely assisted and/or used computer may be an Apple desktop computer. In fact, the person having ordinary skill in the art will readily recognize that the translating configuration feature of the command link 120 allows for alternative combinations of the remote user computer and the remotely assisted and/or used computer, and are therefore not limited to those exemplary combinations listed above.

Figure 10:
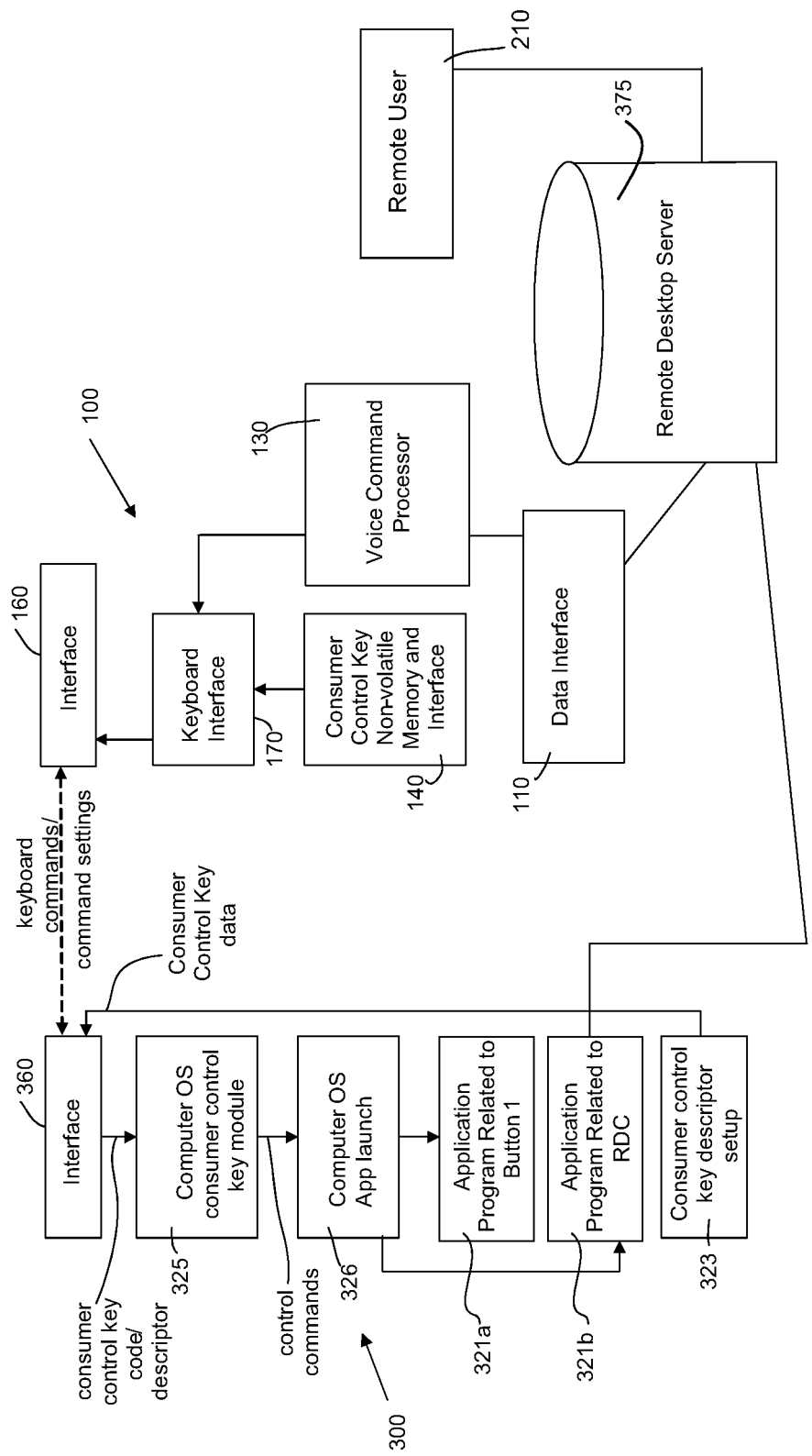
FIG. 10 is a block diagram of an exemplary system for providing remote assistance and/or control using voice commands.

Optionally, the command link 120 may communicate with a voice command processor 130 for processing voice commands received by the command relay device 100 via, for example, the data interface 110 (see FIG. 10). The voice processor 130 may have voice recognition software and voice processing software as is known in the art.

The exemplary command relay device 100 of FIG. 1 may comprise a transceiver 160, such as a Bluetooth transceiver (e.g. Bluetooth transceiver chip) shared by the data interface 110 and the keyboard interface 170. The transceiver 160 shares common circuitry or a single housing allowing it to act as both a transmitter and receiver. Therefore, in the example of a Bluetooth connection, once a Bluetooth connection is established between the command relay device 100 and the remote user device, the transceiver 160 receives keyboard commands from the remote user device and transmits said commands to the data interface 110. A Bluetooth connection is also established between the command relay device 100 and the remotely assisted and/or used computer, the transceiver 160 then transmitting keyboard commands to the remotely assisted and/or used computer, said commands received by the transceiver 160 from the keyboard interface 170, these commands either translated or left unaltered when passing through the command link 120 from the data interface 110 to the keyboard interface 170. Alternatively, the transceiver 160 may establish another form of connection, such as, for example, a WiFi connection. In another embodiment, the transceiver 160 may establish a wired connection with one or both of the data interface 110 and keyboard interface 170, using for example a wired cable connection or fiber optic connection.

The command relay device 100 may also have a video receiver and/or compression and/or transmission module 150 for receiving an image stream from the computer and transmitting said stream to a remote user. The video receiver and/or compression and/or transmission module 150 may have a codec for encoding/compressing the video data, a wireless input interface for receiving the video data, and/or a wireless output interface for transmitting the video data wirelessly to a computer. The stream may be further compressed into, for example, an MPEG format, using, for example, a GPU, for ease of transmission. Compression may allow for removal of the redundancy between video frames which may be useful when transmitting a stream of images of a computer's display, with, for example, a significant level of redundancy between frames. Transmission of an image stream may occur when using, for instance, screen mirroring, as described below in relation to FIGS. 6A, 6B, 6C and 6D.

FIG. 2 shows an alternative embodiment of the exemplary command relay device as taught in the present invention. A command relay device 100 has a data interface 110 and a keyboard interface 170, connected via the command link 120. The data interface 110 has a WiFi receiver 161. The keyboard interface 170 has a separate Bluetooth transmitter 162. In this alternative embodiment, the data interface 110 establishes a WiFi connection with the remote user. This WiFi link may be an IEEE 802.11 link. Alternatively, a wireless USB or WUSB link may be used to establish a connection between the data interface 110 and the remote user. Command input is received via this WiFi link by the data interface's WiFi receiver 161. The command input is then sent via the command link 120 to the keyboard interface 170. Once a Bluetooth connection is established between the keyboard interface 170 and the remotely assisted and/or used computer, the control commands corresponding to the command input are then transmitted via the keyboard interface's 170 Bluetooth transmitter 162 to the remotely assisted and/or controlled computer. The person having ordinary skill in the art will readily recognize that other forms and/or combinations of wireless connections and transmitters/receivers for exchanging data between the remote user computer and the data interface 110, and for exchanging data between the keyboard interface 170 and the remotely assisted and/or used computer, may be used without departing from the present teachings.

In a preferred embodiment, the command relay device is a dongle. For example, the dongle would be located near the remotely assisted and/or used computer allowing for the establishment of a Bluetooth connection between the two. Additionally, in another example, the dongle may instead be located near the remote user computer to establish a Bluetooth connection with same. The dongle may also be near both the remotely assisted and/or used computer and the remote user computer for establishing a Bluetooth connection with both computers. The location of the dongle would depend on its features and on the type of connection it would establish with each computer. The dongle can be powered using a standard button battery (e.g. a Lithium CR2032 type battery). In alternative embodiments, the command relay device may be a USB key or a module integrated in or connected to either the remote user computer or the remotely assisted and/or used computer. It can also be integrated into a phone holder/case or tablet holder/case. The person skilled in the art will readily recognized that the command relay device may be provided as other forms of hardware without departing from the present teachings.

Figure 3:
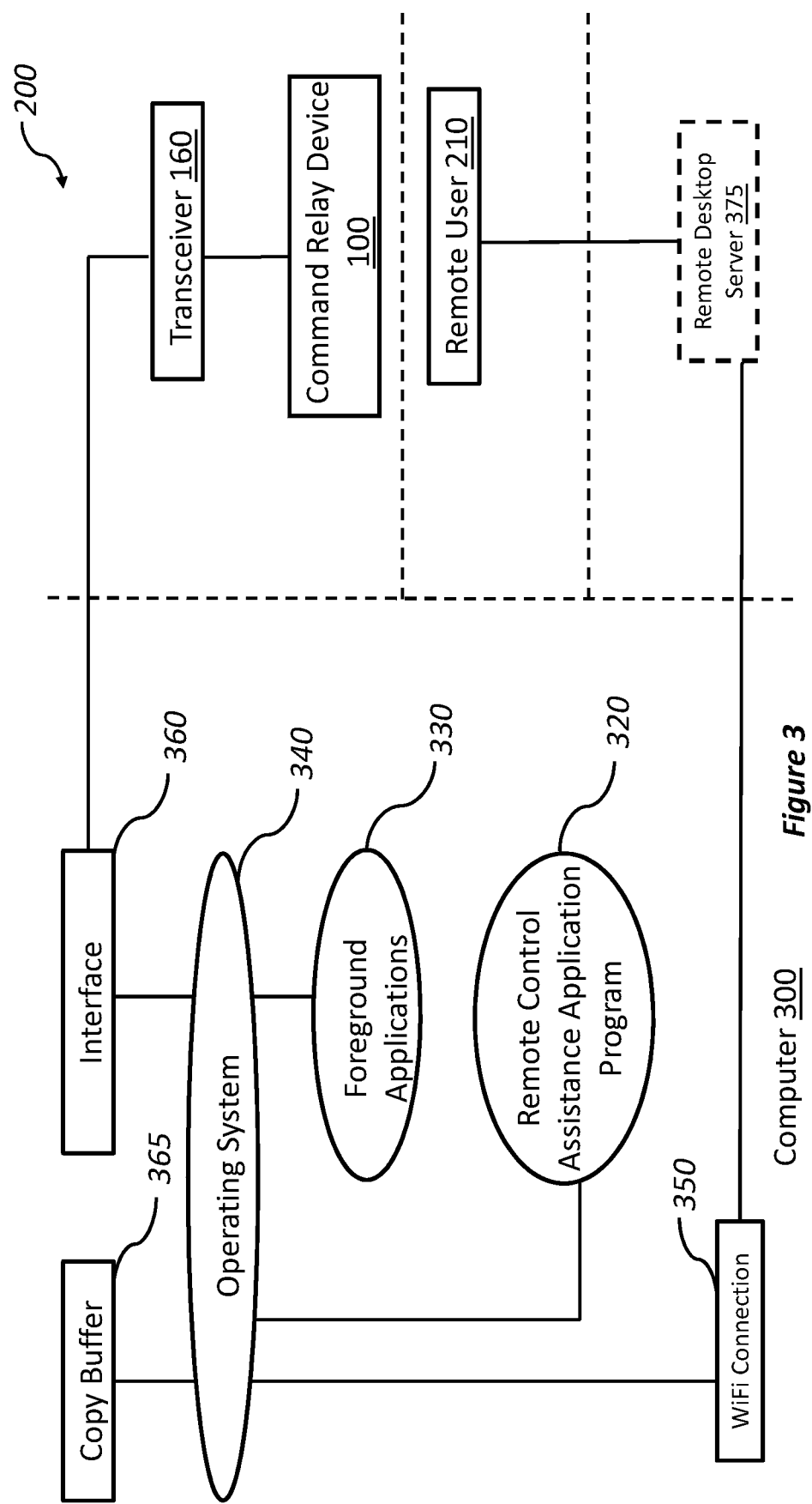
FIG. 3 is a block diagram illustrating an exemplary system for providing remote assistance and/or control.

FIG. 3 is an exemplary embodiment of a system for remote assistance 200 of a computer 300 operated by a local user requiring remote assistance. The system 200 may comprises a computer 300 having an operating system 340 allowing for multiple application programs, including foreground applications 330, to run at the same time in a sandboxed manner such that they are limited in their communication and sharing of data between application programs. In other embodiments, the application programs run with a sandbox limitation. An exemplary operating system 340 is the Apple iOS, as found, for example, running on the Apple iPhone®, iPad® and iPod Touch®. Other examples of computers 300 are those with an operating system 340 such as, for example, the Apple OS X, the macOS and watchOS. The computer's OS 300 may also have a copy buffer 365 which is sharable between the computer's 300 application programs. The copy buffer 365 may be a clipboard manager and can store screen images or other data. The system 200 also comprises a command relay device 100, such as the exemplary embodiments of same as shown in FIG. 1 and FIG. 2. The system 200 further comprises a remote control assistance application program 320 stored in memory on the computer 300. The remote control assistance application 320 is permitted to run in a background mode. For example, a background mode is one that runs behind the scenes, without user intervention. An application running in background mode may also be one that does not create a user interface. Furthermore, the command relay device 100 is operative to send keyboard commands to the computer 300 to place a screen image of a foreground process of the computer 300 into the copy buffer 365 where the background mode remote control assistance application program 320 can access the screen image. Moreover, the command relay device 100 and/or the remote control assistance application program 320 is configured to send information about a foreground mode of the computer 300 obtained by the remote control assistance application program 320 from the screen image to a remote user 210.

The foreground applications 330 of the exemplary computer 300 may be native application programs of the computer 300 or downloadable application programs.

The computer 300's copy buffer 365 stores in the computer 300's memory a captured screen image of the computer 300. The screen image may then be retrieved by the remote control assistance application program 320 and forwarded to the remote user 210 using, in the example of the present embodiment, a WiFi connection 350. Alternatively, the remote control assistance application program 320 may forward the screen images to the command relay device 100 via a wireless or wired connection. The command relay device 100 then may transmit the screen images to the remote user 210. The screen images are then displayed on the remote user's 210 computer which may then begin providing remote assistance and/or use, now that the remote user 210 is capable of visualizing the remotely controlled and/or used computer's 300 display.

The command relay device 100 or the remote control assistance application program 320 is configured to send information about a foreground mode of the remotely assisted and/or used computer 300 obtained by the remote control assistance application program 320 from the screen image of the computer 300 to a remote user 210. The information sent about the foreground mode of the computer 300 may be a screen image. However, this information may also include, for example, a string of text messages sent by the computer 300. These text messages may be stored in the sharable copy buffer 365 and then accessed by the remote control assistance application program 320. In another example, the remote control assistance application program 320 may send an alert when a given target application program is being used on the computer 300. In this case, the computer 300 is given the command by the command relay device 100 to take a screen capture of the computer's 300 display, the screen image stored in the copy buffer 365. The remote control assistance application program 320 then receives the exemplary screen image of the start-up page of say, the undesirable application. The remote control assistance application program 320 then compares the exemplary screen image with the screen capture, and if the images match (using, for example, image recognition techniques such as edge matching or divide-and conquer matching), an alert is sent by the remote control assistance application program 320 to the remote user 210. The person having ordinary skill in the art will recognize that other information of the foreground mode of the computer 300 may be provided and then processed without departing from the present teachings.

The screen image may be processed locally by, for example, the command relay device 100, to, for example, gain certain additional screen information or reduce the amount of data transmitted between the command relay device 100 and the remote user 210. For example, the screen image may be processed using a MPEG encoding. Following this encoding, each screen image frame may be compared, and only changes in the image per frame may be transmitted to the remote user 210. Alternatively, in another example, processing may involve recognizing specific screen elements and sending screen element state data to the remote user 210. In exemplary embodiments, such recognition may consist of applying appearance-based methods such as edge matching or divide-and-conquer matching.

This additional screen information may then be sent to the remote user 210 via, for example, a WiFi connection 350.

The keyboard commands as described in the system 200 may be such that they prompt the computer 300 to begin taking automatic periodic screen images when the remote assistance of the computer 300 begins. An exemplary sequence of keyboard commands for causing said computer 300 to take a screen capture may be:

```
playPressedCmd[16] = 0x01;
    ISPP_Send_Control_Message(BluetoothStackID,
SerialPortID,0x6802,sizeof(playPressedCmd),playPressedCmd);
    playPressedCmd[17] = 0x02;
    ISPP_Send_Control_Message(BluetoothStackID,
SerialPortID,0x6802,sizeof(playPressedCmd),playPressedCmd);
    playPressedCmd[17] = 0x00;
    ISPP_Send_Control_Message(BluetoothStackID,
SerialPortID,0x6802,sizeof(playPressedCmd),playPressedCmd);
    playPressedCmd[16] = 0x00;
    ISPP_Send_Control_Message(BluetoothStackID,
SerialPortID,0x6802,sizeof(playPressedCmd),(unsigned
char *)playPressedCmd);
```

The keyboard commands may also prompt the computer 300 to stop taking the automatic periodic screen images once the remote assistance has ended.

Now turning to the remote control assistance application program 320, this application program 320 communicates with the remote user 210 and relays command data from the remote user 210 to the command relay device 100. The remote control assistance application program 320 may be stored in the memory on the computer 300 and may be a native application or a downloadable application.

In an exemplary embodiment of the system 200, the remote control assistance application program 320 communicates with the remote user 210 using a WiFi connection 350 to the Internet. As such, when the remote user 210 enters keyboard commands in response to a remote assistance request from computer 300, these keyboard commands may then be sent as command data via the WiFi connection 350 to the remote control assistance application program 320 running in the background on the remotely assisted and/or used computer 300. In an alternative embodiment, the communication between the remote control assistance application program 320 and the remote user 210 may be provided using another form of connection, such as via a Bluetooth connection, using the remotely assisted and/or used computer's Bluetooth interface and the remote user's Bluetooth interface. However, as a Bluetooth interface is bandwidth limited and can only establish a close range connection, the Bluetooth interface may not be an optimal choice when the remote user 210 is out of range (in the case, for example, of an out of country manufacturer), or when large quantities of data are to be transmitted via the interface over time. In some embodiments, the background application program 320 may not have a connection with the remote user 210 to receive keyboard commands (e.g. when the keyboard commands are sent directly to the command relay device 100).

Once received from the remote user 210, the remote control assistance application program 320 may relay command data from said remote user 210 to said command relay device 100 using a Bluetooth connection, the Bluetooth connection established between the computer's 300 Bluetooth interface 360 and the command relay device's 100 Bluetooth interface 160. In an alternative embodiment, the command data may be relayed to the relay command device 100 using another form of connection, such as WiFi connection or a wired connection. Alternatively, the command data may be sent directly by the remote user 210 to the command relay device 100 without passing by the remote control assistance application program 320.

The embodiment of FIG. 3 has the advantage over certain prior art systems that the remotely assisted and/or used computer 300 may be shut off and locked and still be subject to remote assistance without the physical intervention of the local user. For example, the remote user 210, communicating with the command relay device 100, and sending command data to turn on the computer 300, can cause the computer 300 to be unlocked, e.g., by sending, for example, keyboard commands to unlock the computer 300, and thus allowing remote assistance to begin, and this without the intervention of the local user.

Figure 4:
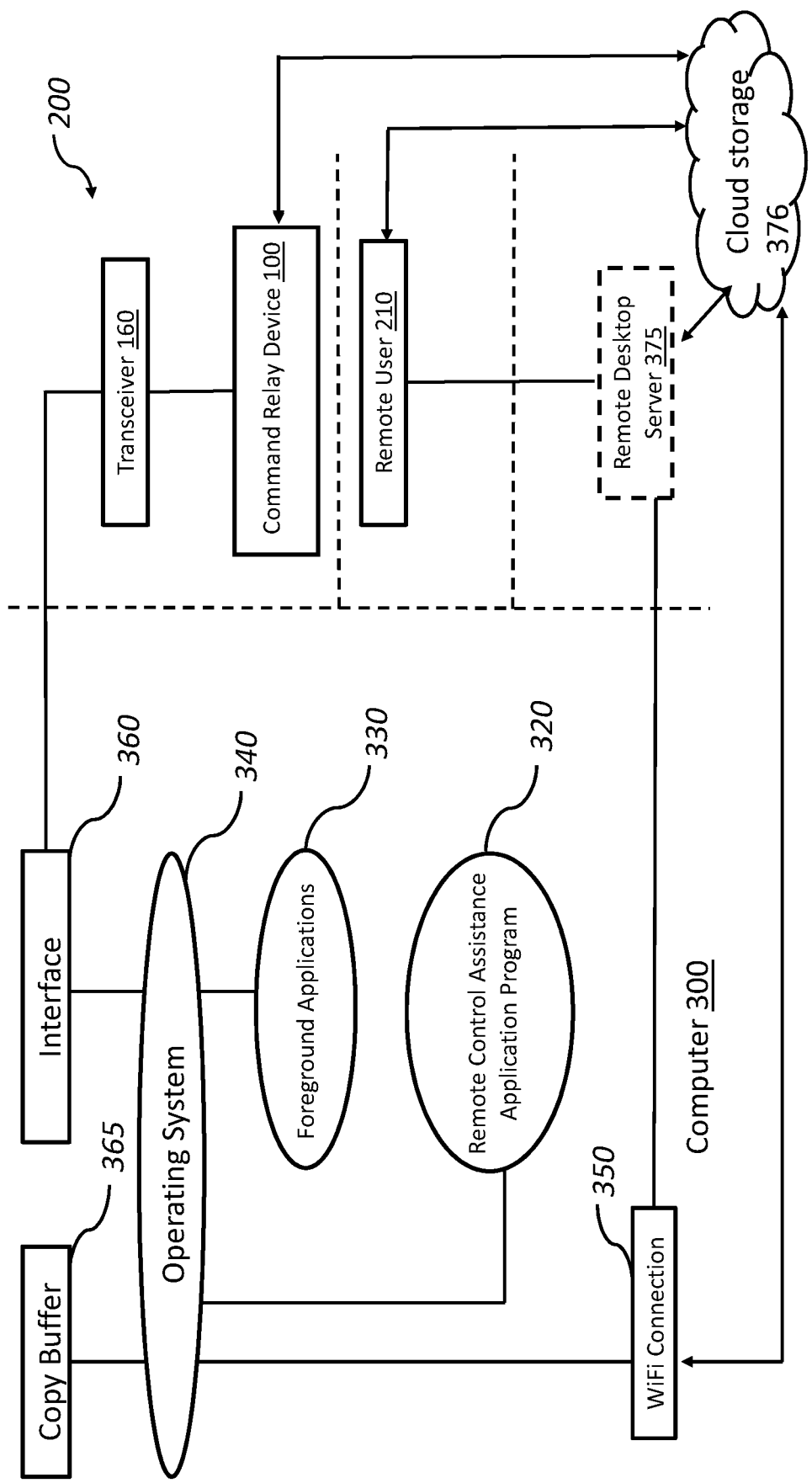
FIG. 4 is a block diagram illustrating an exemplary system for providing remote assistance and/or control using cloud storage.

In an alternative embodiment illustrated in FIG. 4, where the remotely assisted and/or user computer 300 stores data in the cloud 376, such as the Apple™ device backing and/or storing its data to the iCloud™, the data of the computer 300 stored in the cloud 376 may be further accessed by the remote user 210 to enhance the provision of remote assistance and/or control. It may be accessed directly by the remote user 210, or indirectly using the command relay device 100 and/or a remote desktop server 375. As the Cloud 376 allows the computer to wirelessly store the computer's data such as music, photos, applications, text messages, documents, bookmarks, reminders, notes, and contacts, this data may be shared wirelessly with another computer, such as with the remote user's 210 computer. In an alternative embodiment, the remotely assisted and/or used computer's 300 Cloud data may be used by the remote user 210 to provide a monitoring service of the remotely assisted and/or used computer 300. For example, a remote user 210, in this case a parent, may receive information that a local user, a minor, is using a specific undesirable application program. Provided with the information that the undesirable application program has been uploaded to the minor's computer (uploaded to the Cloud 376), the parent may issue a series of keyboard commands directed towards deleting the undesirable application. This "delete" command data may be received by the command relay device 100 and/or the minor computer's remote control assistance application program 320, and keyboard commands are subsequently issued by the command relay device 100 and transmitted to the minor's computer 300, these keyboard commands carried out by the computer's operating system 340, deleting the undesirable application. This is but one example of the features achieved by using the present invention and the Cloud 376, and the person skilled in the art will readily recognize that other features may be achieved using the combination of cloud storage and the present system without departing from the present teachings.

In the exemplary embodiment of the system 200 of FIG. 3, the computer's 300 operating system 340 communicates with the command relay device 100 using a Bluetooth connection, established between the computer's 300 Bluetooth interface 360 and the command relay device's 100 Bluetooth interface 160. The command relay device 100 may then transmit keyboard commands to the computer 300 via the Bluetooth connection.

The command relay device 100 may alternatively comprise a mic and a speaker. In this alternative embodiment, the command relay device may establish an audio channel between the local user requesting remote assistance and the remote user providing the remote assistance. This audio channel will allow the local user to communicate with the remote user when obtaining remote assistance. For example, the remote user may provide the local user feedback related to the assistance or explain verbally what actions the remote user is carrying out. This audio channel may be established using, for example, a Bluetooth connection between computers, or a WiFi connection. The person having ordinary skill in the art will readily recognize that other forms of connections may be used to establish an audio channel without departing from the teachings of the present invention. In an alternative embodiment, the command relay device 100 may have a wired, and not a wireless, connection with either the remote user 210 or the computer 300.

In the exemplary system 200, the remote control assistance application program 320 may be brought from the background to the foreground of the computer 300, where the local user of the computer 300 may be provided with visual assistance originating from the remote user's 210 computer. For example, in some embodiments, this switch from background mode to foreground mode may be triggered by the computer 300 receiving keyboard commands, issued by the remote user 210. Such keyboard commands may be, for instance, on an iOS smartphone device, such as an iPhone®, those of calling the Spotlight Search feature, followed by keyboard commands for the characters making up the name of the remote control assistance application program 320, and a command to select the remote control assistance application program 320 displayed in the search results, this selection resulting in the switching the remote control assistance application program 320 to foreground mode. In another example, this switch from the background to the foreground may alternatively be initiated by the local user, selecting this option using a remote control assistance application 320 selection button visible on the computer's 300 display. Such visual information may include, for example, screen images of the remote user's 210 computer. These screen images may be altered versions of those received by the remote user 210 from the computer 300. In other words, once visualized on the remote user's 210 computer, these screen images may be marked up and then sent back to and visualized by the computer 300, these altered screen images highlighting the action that the local user is to perform on the computer 300. In this example, the remote user 210 may mark up the screen image, showing where on the local user's computer 300 screen the local user is to touch or click so as to reach a desired result. Therefore, in this example, the remote control assistance application program 320, now in the foreground, may display screen images of the remote user's 210 computer screen, the remote user's 210 computer screen replicating the actions that the local user is to carry out in order to reach a result desired by the local user. The remote control assistance application program 320 may receive these altered screen images from the remote user 210 using the WiFi connection 350. Furthermore, keyboard commands may be dispatched from the remote user 210 to switch the remote control assistance application program 320 from the computer's 300 foreground to the background, thus returning to the foreground the given application program, settings or home screen that the local user is interested in, visible before the remote control assistance application program 320 went from background mode to foreground mode. Alternatively, the switching of the remote control assistance application program 320 may be achieved by the local user manually selecting this option on, for example, the display of the computer 300, such an option in the form of a button visible in the remote control assistance application program's 320 as displayed on the screen of the computer 300 when this assistance program is in foreground mode.

In the exemplary system 200, the command relay device 100 and/or the remote control assistance application program 320 may be configured to receive command data from the remote user 210. The command data may be associated with a touch screen such as simple or multi-touch gestures with a special stylus by using one or more fingers like, in the case of the Apple iPhone®, the swipe action to unlock the phone. These gestures may also include the use of an on-screen keyboard or on-screen mouse. Command data may also include pressing peripheral buttons on the touch screen device like the volume button or the home button. Command data may also be the entering of keys on a physical keyboard, the clicking of a physical mouse or the movements of the mouse cursor on the screen or the pressing of buttons on a joystick or game controller. The person having ordinary skill in the art will recognize that other forms of command data may be used without departing from the teachings of the present invention.

Once received, this command data causes the command relay device 100 to issue control commands to the remotely assisted and/or used computer 300 on behalf of said remote user 210 for performing remote control. The command relay device 100 may translate or process the command data in order to issue control commands that are understood by the remotely assisted and/or controlled computer 300. The keyboard commands may include commands for pointer control and/or touch screen press location control. The person of ordinary skill in the art will readily recognize that the keyboard commands may include other commands than those described above without departing from the present teachings.

Optionally, in the exemplary system 200, a remote desktop server 375 may connect the remote user 210 to the remotely assisted and/or used computer 300 and/or the command relay device 100. The remote desktop server 375 may establish a WiFi connection 350 with the computer 300. The remote desktop server 375 receives screen images from the computer 300 and forwards these images to the remote user 210. The remote desktop server 375 may also receive command data, screen images and other input from the remote user 210 and transmits this input to the remote control assistance application program 320 and/or to the command relay device 100.

Depending on the connection type between the command relay device 100, the remote user 210 and the computer 300, different network structures may be adopted such as a wireless PAN network, a wireless local area network, a wireless mesh network, a wireless wide area network, a wireless metropolitan area network, a global area network or even a space network.

The command relay device 100 may also operate with more than one remotely assisted and/or used computers 300. In this case the command relay device's 100 keyboard interface is adapted to be able to link to multiple computers 300. This feature may be useful in a school environment where students are familiarizing themselves with the features and workings of, for example, iPad devices. The teacher, in this case, the remote user 210, can share command data with more than one computers 300 operated by the students, assisting them with the navigation of their tablets. Similarly, the remote user 210 may receive screen information from more than one of the students' computers 300, the remote user 210 establishing a WiFi connection 350 with more than computers 300 through the computers' 300 one wireless interfaces. Therefore, the command relay device 100 may be used to control and in effect monitor the use of a number of computers 300 (such as tablet computers), this feature applicable to classroom settings and many other contexts.

Figure 5:
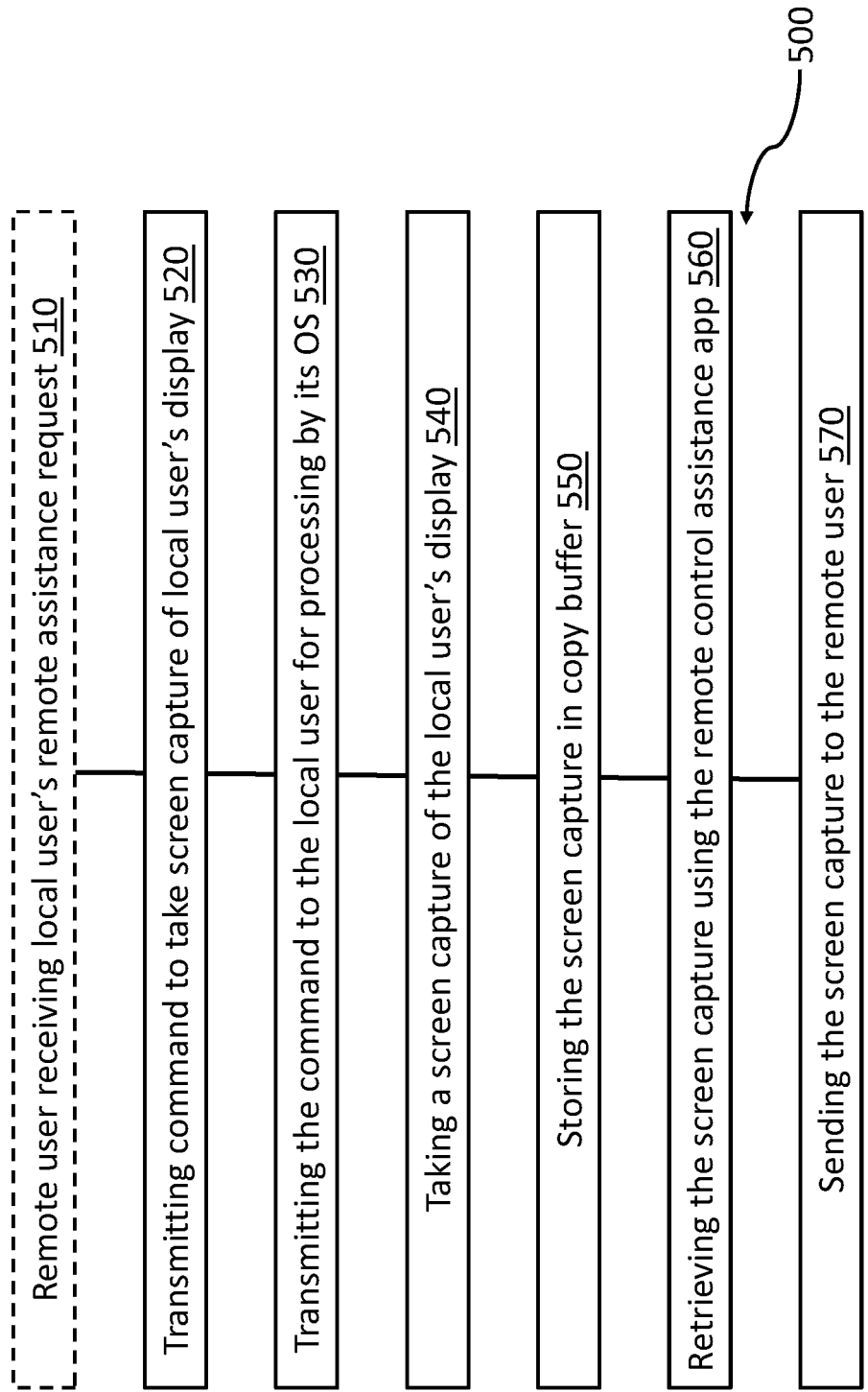
FIG. 5 is a flowchart diagram of an exemplary set of steps involved in sharing a screen image when providing remote assistance.

FIG. 5 shows a flow diagram of an exemplary set of steps involved in sharing a screen image when providing remote assistance 500. Optionally, the remote user 210, who is to provide remote assistance, may receive a request from a local user of a computer 300 requesting remote assistance at step 510.

The remote user 210 may transmit, via, for example a WiFi connection, command data to take a screen capture of the display of the remotely assisted computer 300 at step 520. The command data may be transmitted to, for example, a remote control assistance application program 320 operating in the background of the remotely assisted computer 300, which, once it has received the command data, transmits the command data to a command relay device 100 for relaying the command data back to the remotely assisted computer 300. In another example, the remote user's command data may be transmitted directly to the command relay device 100. Optionally, the command relay device 100 may translate, when required, the command data received so it may be understood by the remotely assisted computer's OS 340 (e.g. when the command data is sent by a PC in the form of the clicks of a mouse or strokes of a keyboard and are to be processed by an iOS device such as an Apple iPhone® or iPad®). In another example, instead of translating the command data, the command data may be processed by the command relay device 100 using, for example, a preconfigured layout of a peripheral device (e.g. a keyboard or a mouse) of the remote user's 210 computer, where the command relay device 100 may have, optionally, memory for storing the layout information. The command relay device 100 may process the command data in accordance with the layout information so it may be understood by the remotely assisted computer 300. The command relay device 100 then transmits keyboard commands (corresponding to the command data) to the remotely assisted computer's OS 340 for processing at step 530.

The keyboard commands are processed by specific application programs running on the OS 340 as if the user were inputing the commands. The processed keyboard commands are carried out, thus causing the taking of the screen capture at step 540 by, for example, the application program responsible for taking screen captures. The screen capture is then stored in the remotely assisted computer's sharable copy buffer 365 at step 550. Having access to the copy buffer 365, the remote control assistance application program 320 may then retrieve the screen capture in the copy buffer 365 at step 560. The screen capture can either be sent by the remote control assistance application program 320 of the remotely assisted computer to the remote user 210, via, for example, a WiFi connection or wired connection between the remotely assisted computer 300 and the remote user 210. In another example, where the command relay device 100 has, for example, a wireless module, the screen capture may be sent to the command relay device 100 via a wireless connection, the command relay device 100 may then forward the screen capture via a wireless connection to the remote user 210. Thus, the screen capture is sent to the remote user 210 at step 570. The person skilled in the art will readily recognize that the set of steps 500 may be used for other applications than for remote assistance, such as remote monitoring, without departing from the present teachings.

The command transmitted at step 520 may be, for example, a command to take periodic screen captures at defined time intervals, repeating steps 540-570 periodically each time a screen capture is to be taken. Alternatively, in another example, once the screen capture is sent at step 570, and the remote user receives the screen capture, steps 520-570 may be repeated as necessary during the remote assistance. The remote user 210 may then, for example, identify the applications and layout of the local user's computer 300 by analyzing the screen images and walk the local user through the using of the local user's computer 300.

In the case of the iOS operating system, an application running in the background, such as the remote control assistance application program 320, may be subscribed or connected to a specific message service. For instance, the remote control assistance application program 320 may be connected to a service of the interface 360 of the command relay device 100 and may listen for a message to tell the remote control assistance application program 320 to perform a task, such as to transmit the image in the copy buffer 365. The remote control assistance application program 320 may be launched or started by these messages or triggers. When the iOS 340 receives a message (e.g. a ping) corresponding to the specific message service, the iOS 340 may call the remote control assistance application program 320 to wake up from sleep mode. Once the remote control assistance application program 320 is woken up, the remote control assistance application program 320 may carry out the desired tasks, such as that of taking the screen capture stored in the copy buffer 365, and transmit the screen capture, via, for instance, the WiFi connection 350. The remote control assistance application program 320 may have a limited time to carry out these tasks before being put back into sleep mode and may be short-lived task-based. The remote control assistance application program 320 may also send a notification to the iOS 340 indicating that the remote control assistance application program 320 has completed carrying out its task. The iOS 340 may transmit this information to the command relay device 100, via for example the interface 360 to the transceiver 160, informing the command relay device 100 that the remote control assistance application program 320 has completed carrying out its task. The remote control assistance application program 320 may receive message signals (e.g. pings) so it may wake up (or be called to the foreground) again to carry out its functions. The message signals may be sent periodically to the remote control assistance application program 320 when, for instance, remote assistance or control is required, so that the application program 320 awakes periodically, or does not fall back to sleep (or recede to the background).

In other embodiments, the remote control assistance application 320 may switch from background mode to foreground mode, upon, for example, the local user clicking a button to this effect. The remote assistance control application program 320 may then display screen images on the screen of the remotely assisted computer 300, these screen images sent by the remote user 210. For example, the remote user 210 may send an altered screen image of the screen image received in accordance with the set of steps 500. The screen image may be altered, for example, to indicate through highlighting or circling (e.g. the circling or highlighting added by the remote user's cursor) the button that the local user needs to touch to reach a desired result. The screen image sent by the remote user 210 to the remotely assisted computer 300 may also be a cashed screen image (e.g. stored in memory on the remote user's 210 computer) of, for example, regularly appearing screen images (e.g. an application program's home page) of a designated foreground application program 330 found on the local user's computer 300. These cashed screen images may also be altered by the remote user 210 as described above. As screen images appear on the local user's display as a result of the remote control assistance application program 320 being in foreground mode and receiving these pictures via a wireless connection from the remote user 210, these images may, for example, serve for tutorial purposes, teaching the local user how to use, for example, a designated application program on his computer. Additionally, in an alternative embodiment, the local user may also touch and/or perform certain gestures (e.g. pinch, multi-finger swipe), interacting with the display of the local user's computer 300. These interactions may then be stored as data in the copy buffer 365. The data corresponding to these interactions can then be transmitted by, for example, a wireless connection, to the remote user's 210 remote desktop. The transmission may be done, for example, by the remote control assistance application program 320, or by the command relay device 100 once the command relay device 100 receives the interaction data from the remote control assistance application program 320. The remote user's 210 computer may process the interaction data. The remote user 210 may then, for example, use the processed information data to show the remote user 210 how the remotely assisted local user has interacted with the computer 300 (e.g. has properly followed the instructions or requires further assistance).

The remote control assistance application 320 may be returned from foreground mode to background mode by, for example, the remote user 210 clicking a button to this effect or the remote user sending a command to this effect to the remotely assisted computer 300.

Figure 6A:
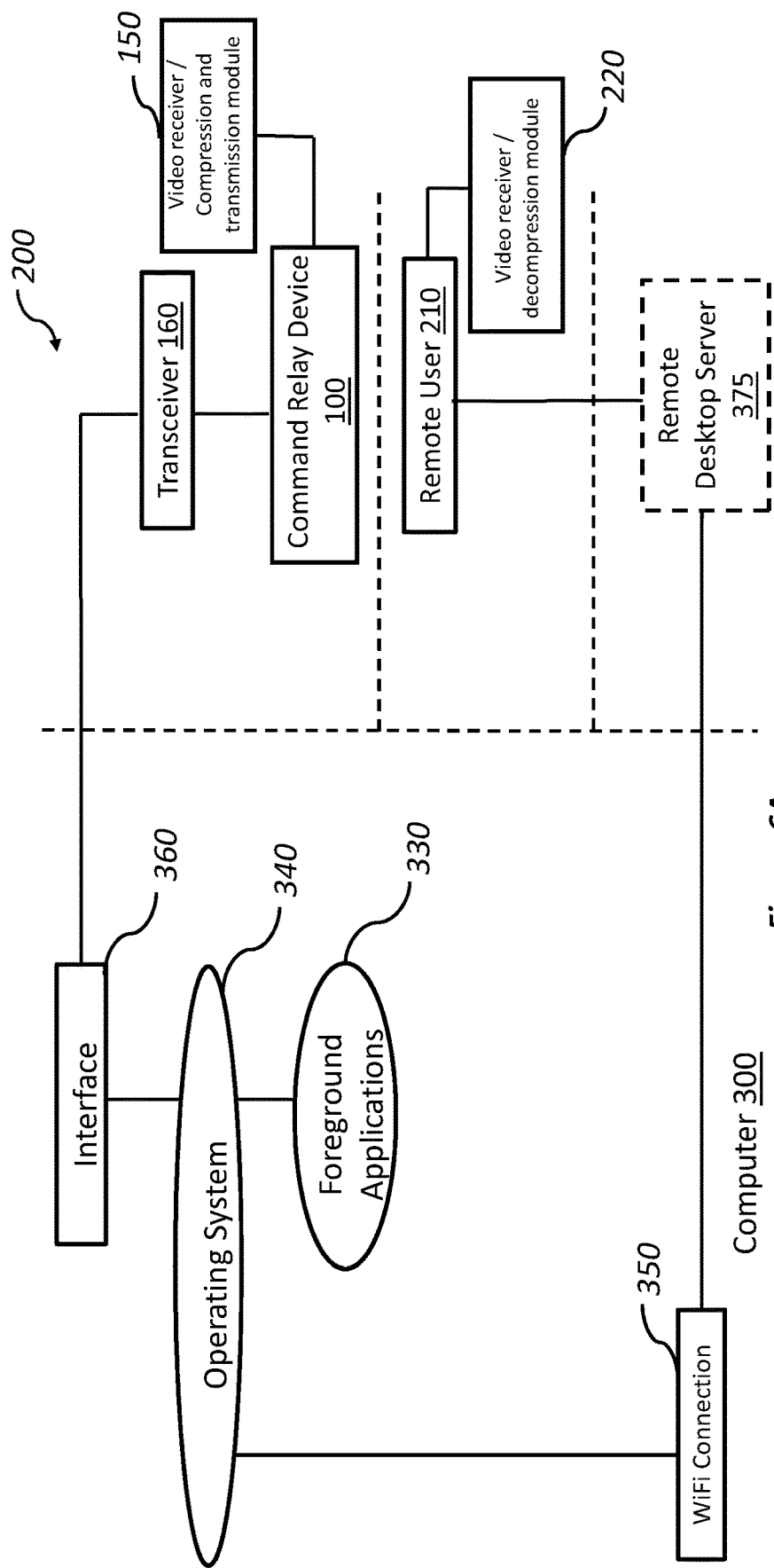
FIG. 6A is a block diagram illustrating an exemplary system for providing remote assistance and/or control using screen mirroring.

In an embodiment of the remote assistance and/or control system as shown in FIG. 6A, screen information of the remotely assisted and/or used computer 300 may be shared with the remote user 210 via a screen mirroring and streaming feature such as the one described in the application program of the limited liability company Squirrels, LLC, branded Reflector 2™. A mirroring and streaming application program may allow for the mirroring of a computer at a given frame rate with a remote user 210, where the remote user 210 and the remotely assisted and/or used computer 300, in some examples, are on the same local network (e.g. share a WiFi connection). This allows for a more streamline provision of remote assistance, as the remote user 210 will be able to provide closer monitoring of the screen of the remotely assisted and/or used computer 300, leveraging the screen mirroring technology to provide the remote user 210 with display information of the remotely assisted and/or use computer 300. The computer 300 may be an iOS device, where Apple's Airplay supports a screen sharing feature. The computer 300 may have a mirroring option where the screen information may be sent directly to the remote user's 210 computer, (such as in the form of a compressed or decompressed video stream) possessing a video receiver and optionally a decompression module 220, via, for example a WiFi connection. The video receiver/decompression module 220 may have a wireless interface for receiving a stream of video data. The video receiver/decompression module 220 may also have a graphics processing unit including one or a plurality of codecs for decompressing the compressed stream of video data. Alternatively, the screen information may be sent by the computer 300 to the command relay device 100, having a video receiver and transmission module and optionally a video compression module 150, and sent in turn to a remote user 210. As mentioned above, the video stream may be compressed or encoded into a given codec by the computer 300 before transmission, into, for example, an MPEG format. Alternatively, it may be compressed by the command relay device 100 (e.g. where the command relay device 100 has a processor, such as a GPU, for encoding the video stream). This mirroring would allow the sharing of information relating to the remotely assisted and/or controlled computer's 300 screen without the need for the use of a copy buffer 365 for, e.g. storing screen captures, or a remote control assistance application program 320 for sending the stored screen captures to a remote user 210. Alternatively, the command relay device 100 may be configured to be wired to the remote user 210, using, for example, a HDMI or VGA port adaptor, where the command relay device 100 may be connected directly to the remote user 210. Alternatively, the command relay device 100 may be wired directly to the remotely assisted and/or controlled computer 300.

Figure 6B:
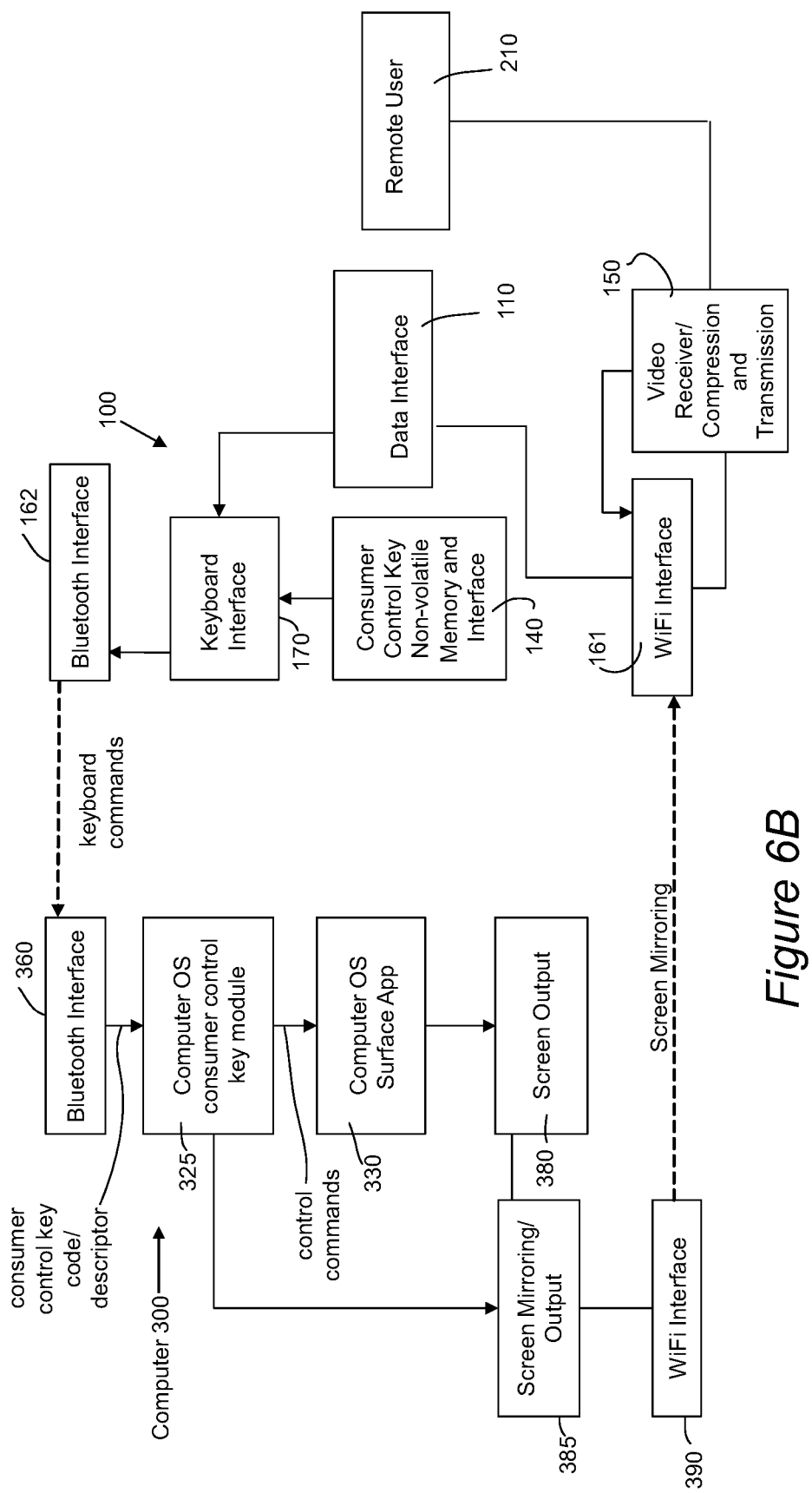
FIG. 6B is a block diagram illustrating an exemplary system for providing remote assistance and/or control using screen mirroring.

Reference is now made to FIG. 6B, showing an exemplary embodiment of a system for providing remote assistance and/or control using screen mirroring. Command relay device's 100 data interface 110 receives command data from a remote user 210, the command data for commencing screen mirroring of a computer 300. The data interface 110 then sends the command data to the keyboard interface 170 where the command data may optionally be processed into keyboard commands. Such processing may be done as a function of the configurations stored in and/or received by the consumer control key non-volatile memory and interface 140. These configurations may relate to, for example, the layout of a keyboard interface or the mouse used by the remote user 210. The command data may then be processed into control commands that may be understood and processed by the computer 300. The control commands are then sent by the keyboard interface 170 via a wireless interface, such as the Bluetooth interface 162 to the computer 300 via its wireless interface, such as its Bluetooth interface 360. Alternatively, the interface between the computer 300 and the command relay device 100 may be wired.

Once received by the computer 300, the control commands are processed by, for example, the computer OS's consumer control key module 325 (e.g. in the case of the iOS device, this module 325 may function with the VoiceOver™ application program or AssistiveTouch™ application program, as further described below). The commands then trigger the desired action of a computer OS surface app 330, such as, in this case, generating a video or screen output 380 that is the screen of the computer 300. The screen/mirroring output 385 is thus generated and transferred, for example, over a WiFi interface 390 to a WiFi interface 161 of, for example, the command relay device 100. The command relay device 100 may then receive, compress (using a given codec, e.g. MPEG) and transmit the screen data using, for instance, a video receiver/compression and transmission module 150 to the remote user 210 (who may receive and decompress the video). In some instances, the compression may be done by a processor module (e.g. a GPU) of the command relay device 100. Compression of the video may be useful to reduce the size of the video's data when there is not much change in the computer's 300 display over time (e.g. when the local user is entering a text message). Alternatively, in some embodiments, the compression may be done by the computer 300 using the computer's video compressor (not shown).

Figure 6C:
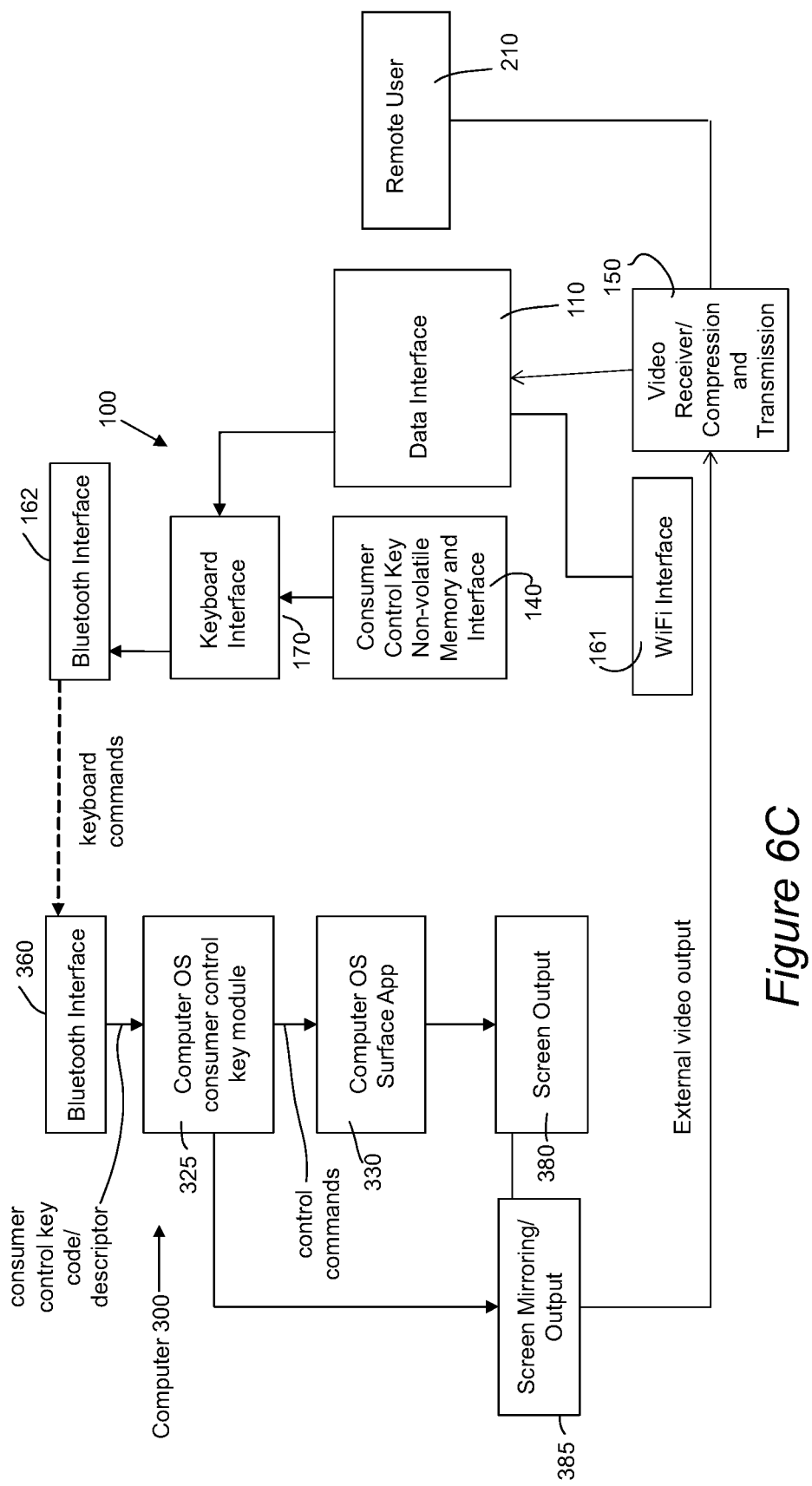
FIG. 6C is a block diagram illustrating an exemplary system for providing remote assistance and/or control using screen mirroring.

As shown in FIG. 6C, the video data may be transmitted from the computer 300 to the video receiver via an external video output, e.g. using a wired or cabled connection such as, for instance, a fiber optic cable, such as by using an HDMI and/or VGA output, connected, for instance, directly between the computer 300 and the command relay device 100, instead of by using a WiFi connection established between WiFi interfaces 390 and 161.

Figure 6D:
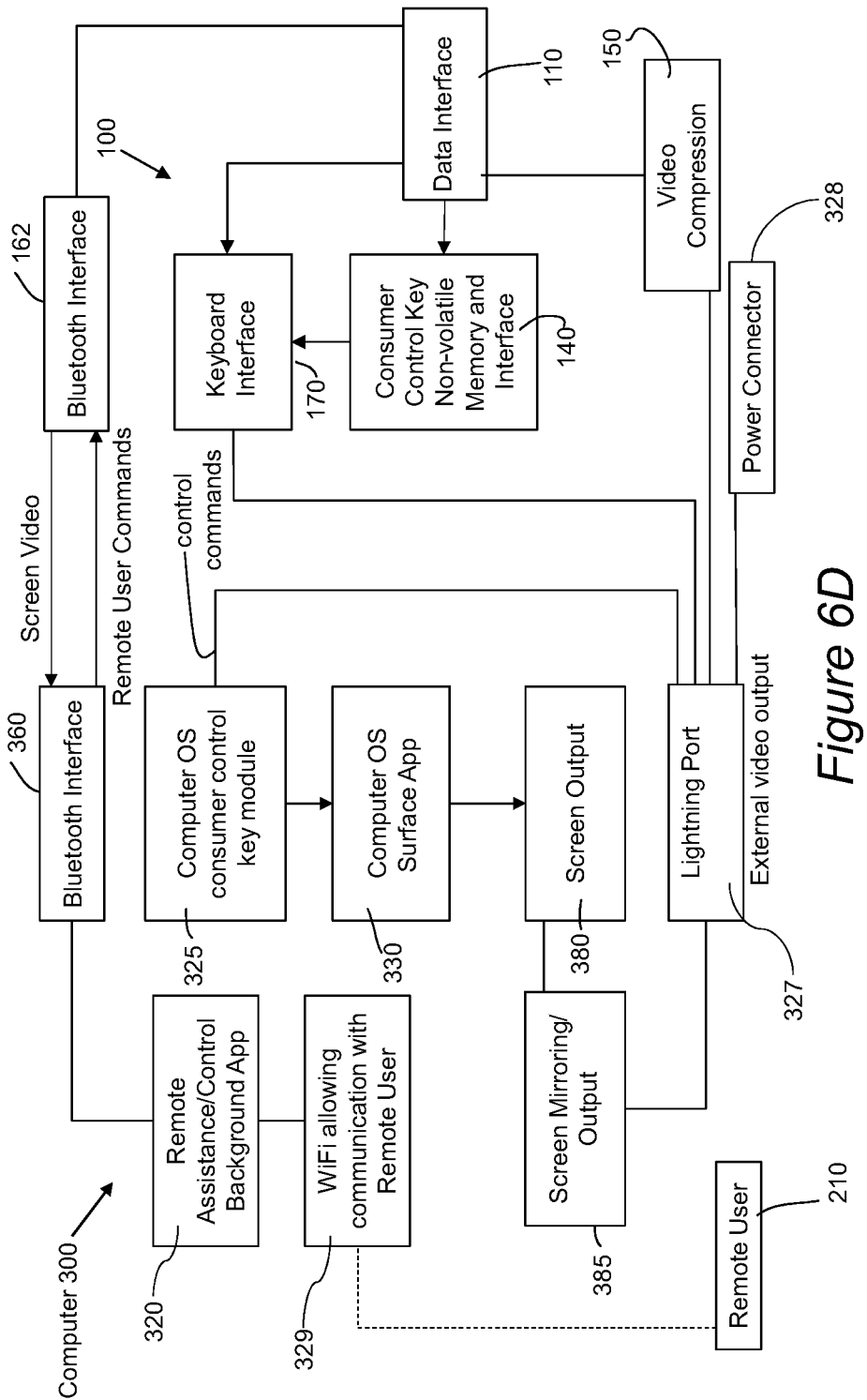
FIG. 6D is a block diagram illustrating an exemplary system for providing remote assistance and/or control using screen mirroring where the command relay device has a wired connection with the computing device.

As shown in FIG. 6D, the command relay device 100 may have a wired connection with computer 300 via a connector such as, for instance, a lightning port 327 (in the case where computer 300 is an iOS device) connected to the keyboard interface 170. It will be understood that other forms of connectors may be used between the command relay device 100 and the computer 300 without departing from the present teachings. The command relay device 100 may transmit the control commands (e.g. keyboard commands, HID commands), via the wired connection to the computer 300. The computer 300 may provide screen mirroring, where the stream of images of the screen are sent from the screen mirroring output 385 to the lightning port 327 and then via the wired connection to the command relay device 100. In some examples, the command relay device 100 may compress the received stream of image data using video compression module 150. Video compression module 150 may have a hardware-based or software-based codec, a graphics processing unit, etc. The computer 300 may also have a wireless interface 329 for establishing a wireless connection (e.g. WiFi connection) with the remote user 210. The command relay device 100 may then send the stream of image data corresponding to the mirror display of the computer 300 to the Bluetooth interface 360 of the computer 300 (via the Bluetooth interface 162). The background application 320 may then be configured to receive the stream of image data of the mirror display, and transmit the stream of image data via a wireless interface 329 to the remote user 210 via a wireless connection (e.g. WiFi connection). This allows the remote user 210 to view the display of the computer requiring assistance/control. In some examples, the remote user command data may be sent by the remote user 210 to the wireless interface 329 of the computer 300. The wireless interface 329 may transmit the command data to the background application 329, that in turns transmits the command data to the command relay device 100 via the Bluetooth interface 360. The command data is then transmitted to the data interface 110 of the command relay device 100, that are then relayed, and/or translated, to the computer 300 via the keyboard interface 170. The lightning port 327 may also be connected to a power connector 328, that is connected or connectable to a power source, to power the computer 300. The command relay device 100 may be connected to an external power source, where the power may be transferred to the computer 300 to power the computer 300 via, for instance, the power connector 328.

Figure 6E:
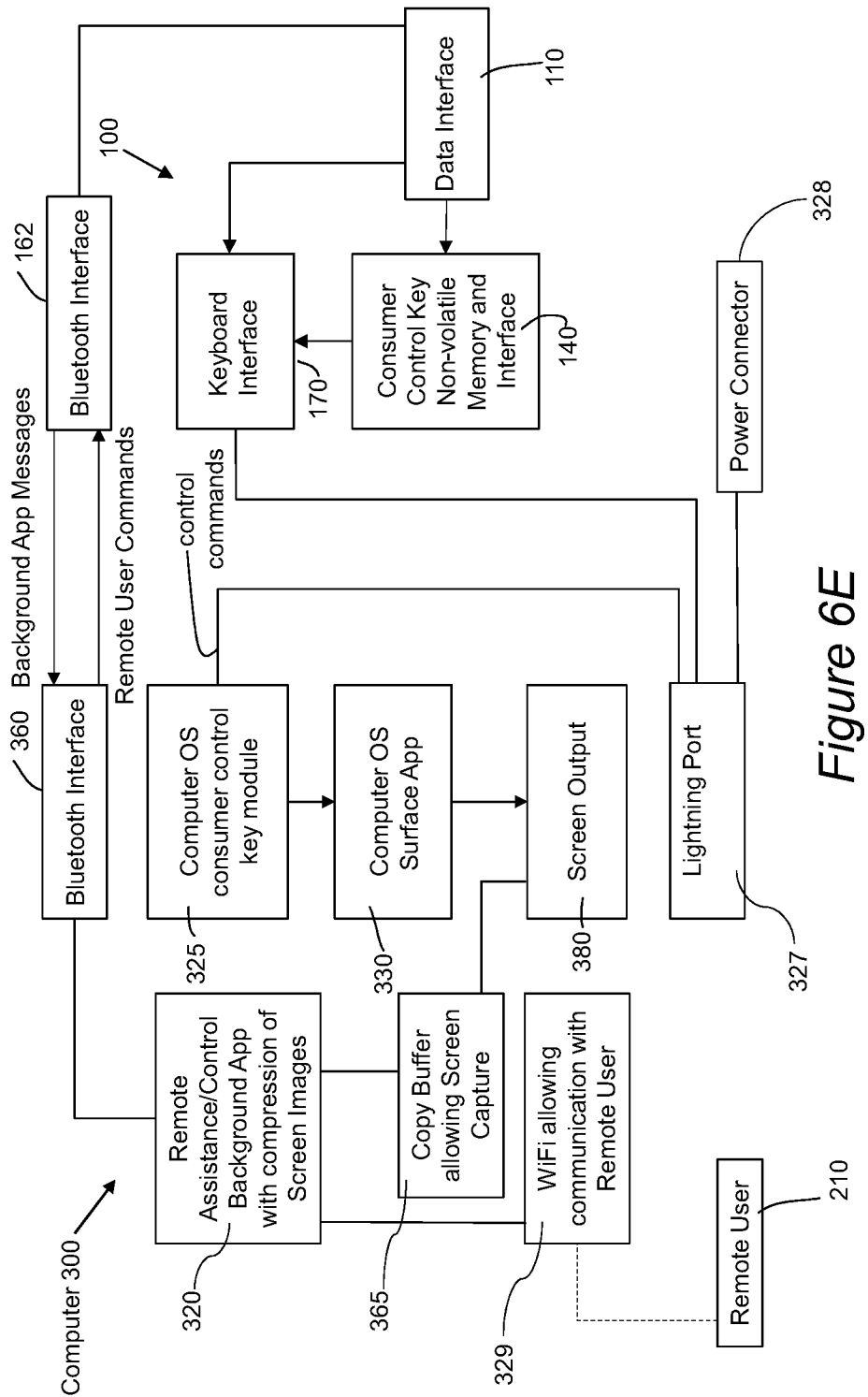
FIG. 6E is a block diagram illustrating an exemplary system for providing remote assistance and/or control using a copy buffer of the computing device where the command relay device has a wired connection with the computing device.

As illustrated in FIG. 6E, the command relay device 100 may also have a wired connection with the computer 300 when screen data of the computer 300 is transferred to the remote user 210 using a copy buffer 365 of the computer 300. Similarly, the command relay device 100 may have a wired connection with the computer 300 using, for instance, a lightning port 327. Control commands (e.g. HID commands, keyboard commands) may be transferred to the computer 300 via the wired connection (lightning port 327). The control commands may be processed so that a surface application program 330 takes a screen capture of the screen, and the screen capture is stored in the copy buffer 365. The command relay device 100 may then send periodically a message signal to the computer 300 (e.g. a ping) that is received by the background application program 320 to retrieve the screen capture stored in the copy buffer 365, and optionally compress the image, then send the image using a wireless connection (e.g. WiFi connection), transmitted by the wireless interface 329 to the remote user 210. The message signals may be sent periodically by the command relay device 100 to the computer 300. The remote user 210 may then, if needed, decompress the image and view the screen capture to provide remote assistance/control of the computer 300. Similarly to FIG. 6D, remote user command data may be sent to the computer 300 via the wireless connection established between the remote user 210 and the wireless interface 329. The wireless interface 329 transmits the command data to the background application 320 that transmits the command data to the command relay device 100 via the Bluetooth interface 360 to the Bluetooth interface 162.

Figure 7:
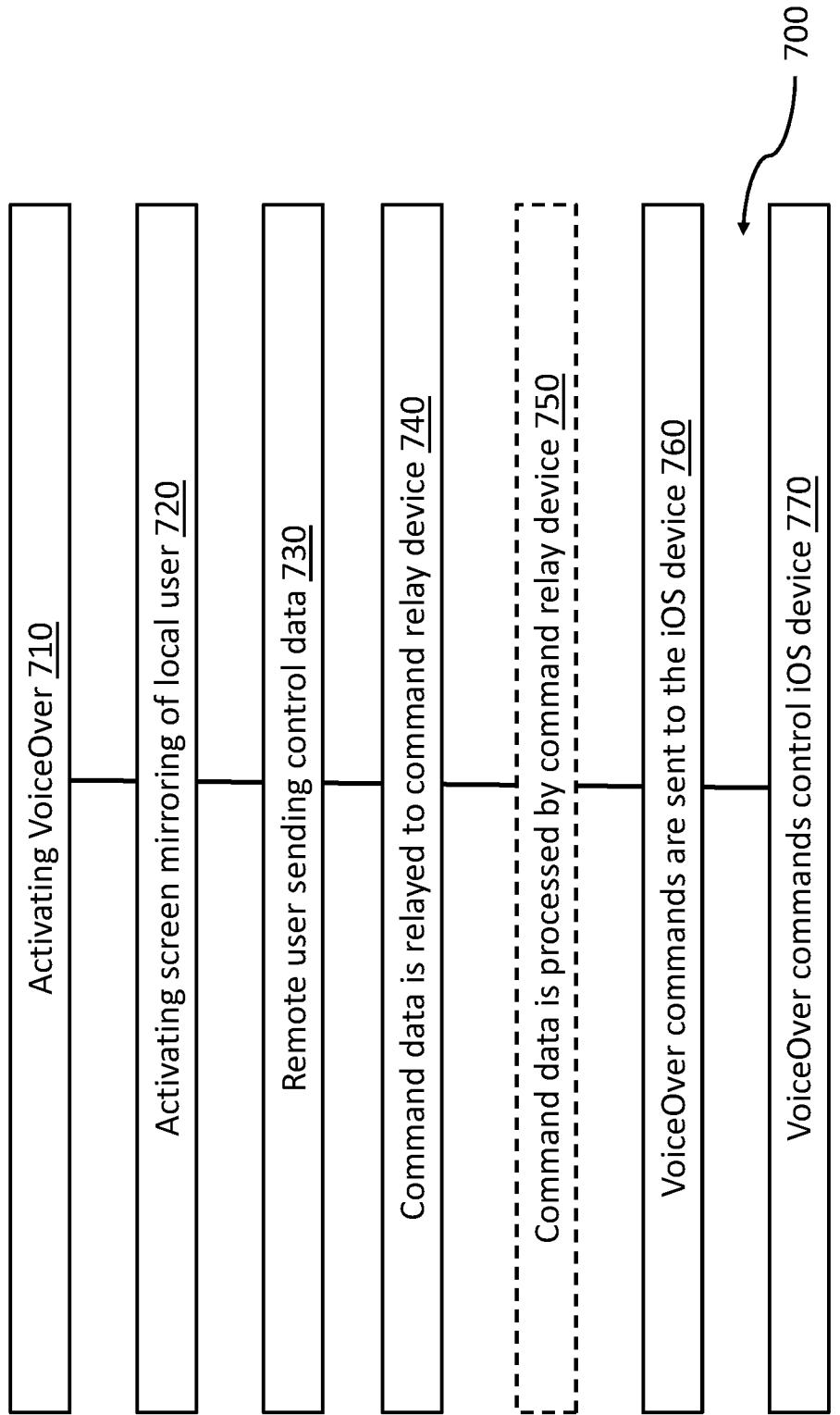
FIG. 7 is a flowchart diagram of an exemplary set of steps for providing remote assistance and/or control to an iOS device using screen mirroring and the iOS' VoiceOver™ feature.

Furthermore, when the remotely assisted and/or controlled computer 300 is an iOS device, such as an Apple iPad or iPhone®, the iOS' VoiceOver™ feature may be implemented with the mirroring to enhance remote assistance, as described in the set of steps 700 of an exemplary method for providing remote assistance and/or control as shown in FIG. 7. VoiceOver™ is a screen reading technology, providing a user with a set of keyboard commands and gestures to control the computer. These VoiceOver™ commands allow the user to navigate and interact with the computer 300. A VoiceOver™ cursor is created which can move around the iOS device's display and describe the items in the cursor. Once a command relay device 100 establishes a Bluetooth or WiFi connection with the iOS device 300 (and between the command relay device 100 and the remote user 210), the iOS device's VoiceOver™ feature may be activated via the command relay device 100, as a result, for example, of a sequence of keyboard commands sent by the remote user 210 to this effect at step 710. Once enabled, a VoiceOver™ cursor may appear on the iOS device's 300 screen. Screen mirroring may be activated on the computer 300 and the computer's 300 screen may be streamed by the remote user 210, or by the command relay device 100, to for example the remote user 210. The remote user 210, now having a visual representation of the computer's 300 display on the remote user's 210 computer, may begin the remote assistance and/or control of the iOS device 300. The remote user 210 may use a HID device, such as a HID keyboard device or HID mouse device, to generate VoiceOver™ commands at step 730 which may be relayed via the command relay device 100 at step 740 to the iOS device 300 at step 760 and may control the iOS device 300 using the enabled VoiceOver™ application program at step 770. The command relay device 100 may optionally receive control data from other forms of peripheral devices, other than an HID device and may process, by translation or using certain configurations that may be stored, for instance, in a memory module of the command relay device 100, the command data originating from the peripheral device to generate VoiceOver™ commands from said peripheral device at optional step 760. The VoiceOver™ commands may be, for example, to move the VoiceOver™ cursor on the display, to open an application program or perform an act equivalent to the swipe motion.

Figure 8:
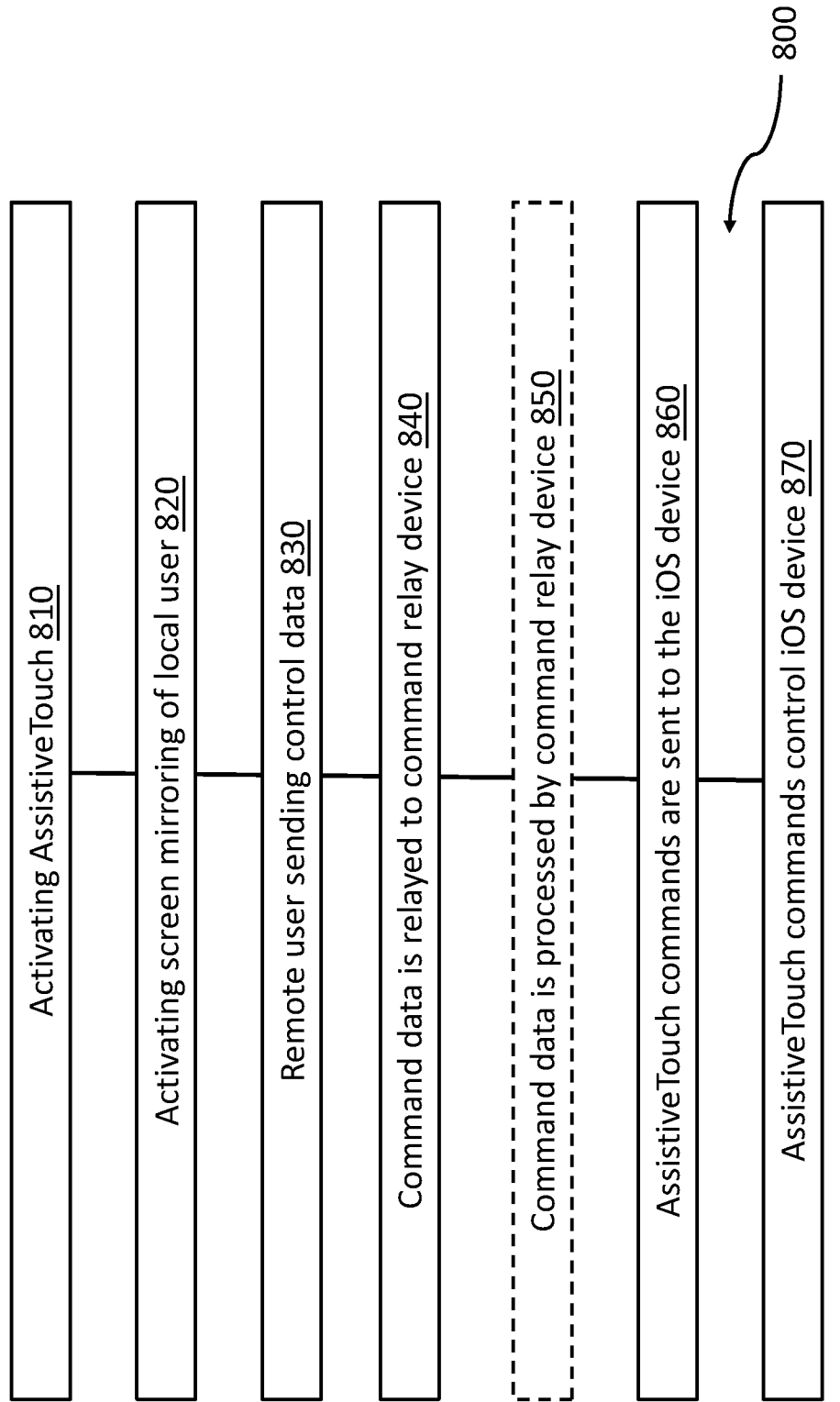
FIG. 8 is a flowchart diagram of an exemplary set of steps for providing remote assistance and/or control to an iOS device using screen mirroring and the iOS' AssistiveTouch™ feature.

Alternatively, or in addition to the use of the VoiceOver™ feature, the mirroring function may be used with the iOS' AssistiveTouch™, as described in the set of steps of an exemplary method for providing remote assistance and/or control 800 as shown in FIG. 8. AssistiveTouch™ is an application program for assisting a user in the controlling of the iOS device, such as in the performance of certain gestures (e.g. pinch, multi-finger swipe) and providing a shortcut for accessing certain features of the iOS device (e.g. the Control Center, Siri). Once the AssistiveTouch™ application program is activated, AssistiveTouch™ may be configured in such a way that a cursor appears on the screen of the iOS device. Once a wireless connection is established between the command relay device 100 and the iOS device 300 (and between the command relay device 100 and the remote user 210), a command to enable AssistiveTouch™ may be sent by, for example, the remote user 210 to the iOS device 300, via the command relay device 100 at step 810. Once AssistiveTouch™ is enabled on the iOS device 300, an AssistiveTouch™ cursor may become visible on the iOS device 300. Screen mirroring may be enabled on the computer 300 at step 820 and the computer's 300 screen may be streamed by the remote user 210 (e.g. using the mirroring enablement feature), or by the command relay device 100, using, for instance, the mirroring enablement feature 150, to for example the remote user 210. The remote user 210, now having a visual representation of the computer's 300 display on the remote user's 210 computer, may begin the remote assistance and/or control of the iOS device 300. The remote user 210 may use a HID device, such as a HID keyboard device or HID mouse device, to generate AssistiveTouch™ commands at step 830 which may be relayed via the command relay device 100 at step 840 to the iOS device 300 at step 860 and may control the iOS device 300 using the enabled AssistiveTouch™ application program at step 870. The command relay device 100 may also include a translating or AssistiveTouch™ command generating feature. For instance, when the peripheral device used by the remote user 210 and thus the command data originating from the peripheral device require processing into AssistiveTouch™ commands, the command relay device 100 may have a translating feature or may have a memory module for storing the configurations of a peripheral device. The command relay device 100 may then process the command data into AssistiveTouch™ commands at step 850. These AssistiveTouch™ commands are then transmitted by the command relay device 100 to the iOS device 300 and processed by the AssistiveTouch™ application program to control the command relay device 100. The AssistiveTouch™ commands may be, for example, to move the VoiceOver™ cursor on the display, to open an application program or perform an act equivalent to the swipe motion.

Additionally, by using a mirroring and streaming application program, the remotely controlled and/or used computer may alternatively view the remote user's screen, which has, for example, received screen images sent by the remote control assistance application program (in an alternative example where there is use of a copy buffer and a remote control assistance application program as shown in FIG. 3), these screen images now visible on the remote user's computer's display. The local user may as a result monitor the actions taken by the remote user as the remote user provides remote assistance and takes action by interacting remotely with the transmitted screen images from the local user's remotely assisted and/or used computer. In this example, the local user is a remote desktop client also requiring remote assistance where the local user may see the actions taken by the remote user and may emulate these actions in turn on the local user's own computer.

The remote user 210 may also share the remote user's 210 screen with the local user via mirroring to provide the local user with a tutorial or to show the local user certain steps which the remote user 210 is performing (without necessarily using a copy buffer 365 and a remote control assistance application program 320 when screen captures and other data are not being stored and sent from the local user's computer 300).

In another alternative embodiment, the remote user may run a copy or emulate a problematic application program found on the local user's computer of which the local user requires remote assistance. Using a mirroring feature as described above, the local user's computer acts like a remote desktop client and may stream the screen images of the remote user's computer as the remote user assists with the use of the problematic application program, allowing the local user to see the application in question being properly run and controlled by the remote user. For example, a remote desktop from the iPad, the local user can also control the remotely executed application program along with the remote user.

Figure 9:
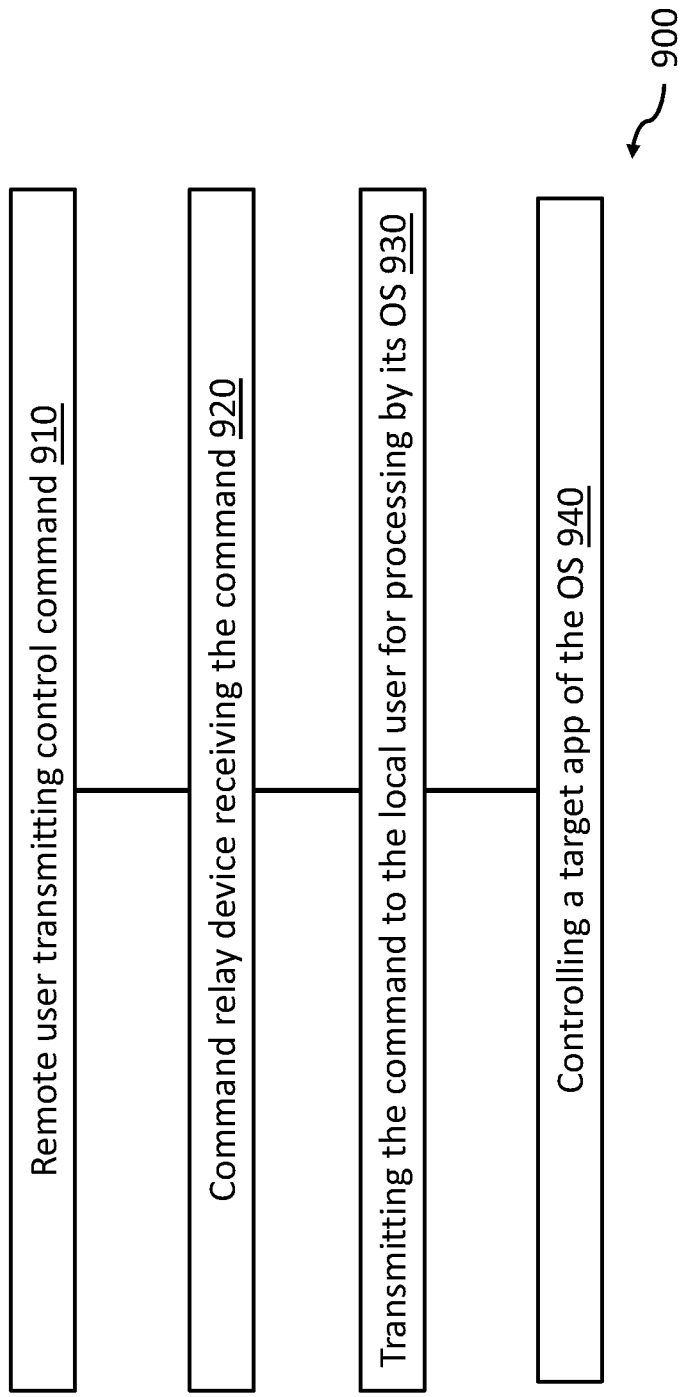
FIG. 9 is a flowchart diagram of an exemplary set of steps involved in remotely controlling a computer.

Reference is now made to FIG. 9, an exemplary set of steps involved in remotely controlling a computer 900. At first, the remote user 210 transmits via a wireless connection (e.g. a WiFi connection) command input at step 910 for causing a local user's computer 300 to perform a desired action. In one example, the control command may be sent to a remote control assistance application program 320 in the memory of the remotely assisted and/or controlled computer 300. In this example, the remote control assistance application program 320 in turn sends the control command to a command relay device 100. In another example, the control command is sent directly by the remote user 210 to the command relay device 100. Thus, once the control command is received by the command relay device 100 at step 920, the command relay device 100 may then optionally translate or configure the control command so it may be processed by the remotely assisted and/or controlled computer 300, as described above in FIG. 5. The command relay device 100 then transmits, via, for example, a Bluetooth connection, control commands (corresponding to the control command) to the remotely controlled and/or assisted computer's OS 340 at step 930. The OS 340 then processes the control commands, the processing done by specific application programs of the OS 340. The processed control commands cause, for example, a designated application to carry out a specific action at step 940. Examples of said actions may include, but are not limited to: opening an application program, increasing or decreasing the computer's volume or brightness, modifying the computer's settings, looking through and identifying a contact in a mobile device's contact list, taking a screen capture, deleting a specific application program, restarting the computer, etc.

Additionally, and in accordance with the teachings of the present invention, the remote assistance and/or control system may be used to provide assistance in game application programs not requiring real time quick reaction. In such applications, command data sent by the remote user 210 may be translated by the command relay device 100 to commands for obtaining a desired result in a game application program. For example, in the Apple iPhone®, some game applications are responsive to vibration or shaking of the smartphone. The keyboard commands sent by the command relay device 100 may be configured to emulate the action of vibrating or shaking of the smartphone 300 and once these commands are processed by the smartphone's iOS 340, they subsequently yield the desired action in the game application.

Remote assistance may also be provided for game application programs requiring real time quick reaction using the mirroring feature as described above, e.g. if the local user's computer 300 and the remote user 210 share a wireless (e.g. WiFi) connection.

In some embodiments, as shown in FIG. 10, the command data sent to the command relay device 100 may be in the form of voice commands, such as those received and controlling a handheld speaker such as the Google Home or Amazon Echo™. For example, if the processor 130 is part of a device like an Amazon Echo™ device that operates with the Alexa™ app on an iPad or an iPhone device using the iOS operating system, keyboard commands can be issued by voice processor 130 to cause the iOS computer to launch the Alexa app (or equivalent) using keyboard commands as described above so as to allow the Echo device (or equivalent, such as the Google Home device) to connect to the Internet using the Bluetooth connection (or equivalent) of the Echo device and the Internet connectivity of the iOS device. In addition to the processor commanding the iOS device to run an app for the processor 130, a voice command can be interpreted and used to control the iOS device to do most any operation or function, like command the playing of music with the selection of Bluetooth audio output without requiring the user to manually control the iOS device. Furthermore, when a voice request received by processor 130 can best be answered by the iOS device opening a given app and then functioning with particular parameters, processor 130 can command the iOS device accordingly using keyboard commands. For example, the processor 130 might cause the iOS device to open a map or navigation app and input an address for a destination to be reached in response to a voice command, and then inform the user to look at the iOS device.

In some embodiments, the voice commands may be received by a remote command network interface 110 and then processed by the voice command processor 130. The remote command network interface 110 may send these commands to the voice command processor 130 which will process the voice commands into keyboard commands recognized by the smartphone, where the processing may be done in function with the processing instructions stored in memory and/or received by a consumer control key non-volatile memory and interface 140. The keyboard commands are then sent by the transmission module 170, using the command relay device's wireless interface, such as a Bluetooth interface 160, to the smartphone's 300 wireless interface (e.g. Bluetooth interface 360), via an established wireless connection, such as a Bluetooth connection. In other examples, the connection may be a WiFi connection or a wired connection. The keyboard commands are then processed by modules 325 and 326 (e.g. in iOS, to trigger a Spotlight search) of the smartphone's 300 OS, resulting in the smartphone 300 carrying out the desired action in accordance with the voice commands, such as triggering an action from the foreground application programs 321a or 321b. Information from the foreground application 321a or 321b (e.g. such as an application program related to the remote desktop client 321b) may also be sent to a remote desktop client 375, via, for instance a WiFi connection. This information may also first be sent to the command relay device 100, then transmitted by the command relay device 100 to the remote desktop client 375. Such information may include, for instance, screen captures, using a copy buffer and a remote control assistance application program as described above, or a video stream of a screen mirroring as described above. This information may allow the remote user 210 to further assist and/or control the computer 300. The computer 300 may be the computer 300 of the remote user 210, where the remote user desires, for example, to configure the computer 300 at a distance or obtain data from computer 300. A consumer control key descriptor setup 323 of the computer 300 may also send command settings (e.g. settings relating to the processing of the command data received by the command relay device 100) to the command relay device 100 via the interface 360 to the interface 160. These commands settings may be, in some instances, stored in the consumer control key non-volatile memory and interface 140.

In an alternative embodiment of FIG. 10, a mic or speaker receiving the voice commands may be integrated into the command relay device 100. The person having ordinary skill in the art will readily recognize that any speaker or device for receiving voice commands may be used as is known in the art.

Furthermore, in another alternative embodiment of FIG. 10, the remote command network interface 110 may receive instead commands in the form of gestures (these commands sent, for example, by a motion sensor or optical sensor for converting motion information into data), such as hand gestures or body signals, these gestures then processed by the command relay device into keyboard commands in accordance with the teachings of the present invention. In other embodiments of FIG. 10, other forms of signals may be processed by the command relay device into keyboard commands, such as heat signals (e.g. by the measurement of infrared radiation), vibrations using, for example, a vibration sensor, humidity (e.g. using a humidity sensor) or light (e.g. using a light sensor) without departing from the present teachings.

The description of the present invention has been presented for purposes of illustration but is not intended to be exhaustive or limited to the disclosed embodiments. Many modifications and variations will be apparent to those of ordinary skill in the art.

What is claimed is:

1. A method of providing remote assistance to a local user or remote control of a computer running a foreground app and able to run a background app, the method comprising:
   providing a command relay device comprising:
      a data interface for receiving command input directly or indirectly from a remote computer;
      a keyboard interface for transmitting at least one control command to an external keyboard interface of said computer; and
      a command link between said keyboard interface and said data interface;
   sharing an image of a display of said computer by performing at least one of:
      sending a command using said keyboard interface of the command relay device to trigger capturing an image of said display and causing a background application program to transmit said image to said remote computer; and
      connecting said command relay device to a video mirroring function of said computer, compressing screen video received at said command relay device and
      transmitting said image of said display of said computer to said remote computer;
   using input from said remote user data to transmit said commands to said data interface to provide remote assistance to said local user or remote control of said computer; and
   transmitting said control commands, corresponding to said command input, via said keyboard interface to provide remote assistance to said local user or remote control of said computer;
   wherein said method by-passes any need for a background app to have within an operating system of said computer direct control access of said foreground app.

2. The method as defined in claim 1, wherein said sharing an image of display of said computer comprises sending a command using said keyboard interface of the command relay device to trigger capturing an image of said display and causing a background application program to transmit said image to said remote computer.

3. The method as defined in claim 1, wherein said sharing an image of display of said computer comprises connecting said command relay device to a video mirroring function of said computer, compressing screen video received at said command relay device and transmitting said image of said display of said computer to said remote computer.

4. The method as defined in claim 1, wherein said control commands comprise HID commands.

5. The method as defined in claim 1, wherein said control commands comprise keyboard commands.

* * * * *